United States Patent
Fujimoto et al.

(10) Patent No.: US 10,537,946 B2
(45) Date of Patent: Jan. 21, 2020

(54) ROD AND CUTTING TOOL

(71) Applicant: Kyocera Corporation, Kyoto-shi, Kyoto (JP)

(72) Inventors: Keisuke Fujimoto, Okaya (JP); Shigeru Matsushita, Omihachiman (JP)

(73) Assignee: KYOCERA CORPORATION, Kyoto-shi, Kyoto (JP)

( * ) Notice: Subject to any disclaimer, the term of this patent is extended or adjusted under 35 U.S.C. 154(b) by 76 days.

(21) Appl. No.: 15/740,381

(22) PCT Filed: Jan. 27, 2016

(86) PCT No.: PCT/JP2016/052324
§ 371 (c)(1),
(2) Date: Dec. 28, 2017

(87) PCT Pub. No.: WO2017/002376
PCT Pub. Date: Jan. 5, 2017

(65) Prior Publication Data
US 2018/0193927 A1    Jul. 12, 2018

(30) Foreign Application Priority Data

Jun. 29, 2015 (JP) .................. 2015-130004
Sep. 26, 2015 (JP) .................. 2015-189048
Nov. 25, 2015 (JP) .................. 2015-229785

(51) Int. Cl.
B23C 5/16        (2006.01)
B23B 51/00       (2006.01)
(Continued)

(52) U.S. Cl.
CPC ............... *B23C 5/16* (2013.01); *B22F 7/062* (2013.01); *B23B 51/00* (2013.01); *C22C 29/08* (2013.01);
(Continued)

(58) Field of Classification Search
None
See application file for complete search history.

(56) References Cited

U.S. PATENT DOCUMENTS 8,163,232 B2 *   4/2012   Fang .................. C22C 29/08
                                                 419/29
2010/0290849 A1   11/2010  Mirchandani
(Continued)

FOREIGN PATENT DOCUMENTS

JP   2004114202 A   4/2004
JP   2012526664 A   11/2012

OTHER PUBLICATIONS

International Search Report based on Application No. PCT/JP2016/052324 (1 Page) dated Apr. 26, 2016.

Primary Examiner — Adam Krupicka
(74) Attorney, Agent, or Firm — Viering, Jentschura & Partner MBB

(57) ABSTRACT

A rod, a cutting tool and a method for manufacturing a cutting tool are disclosed. In an embodiment, the rod may include a cemented carbide member containing WC and Co. The cemented carbide member may be elongated and include a first end portion and a second end portion in a longitudinal direction. The first end portion may have a Co content $Co_{AC}$ smaller than a Co content $Co_{BC}$ of the second end portion. The cemented carbide member may include a first portion on a side of the first end portion and a second portion on a side of the second end portion. The first portion may have a gradient $S_1$ representing a change in a Co content per millimeter. The second portion may have a gradient $S_2$ representing a change in a Co content per millimeter. The gradient $S_1$ may be greater than the gradient $S_2$.

20 Claims, 5 Drawing Sheets

(51) Int. Cl.
 *C22C 29/08* (2006.01)
 *B22F 7/06* (2006.01)
 *B22F 5/00* (2006.01)
 *C22C 1/05* (2006.01)

(52) U.S. Cl.
 CPC ..... *B22F 2005/001* (2013.01); *B23B 2222/28* (2013.01); *B23B 2222/92* (2013.01); *B23B 2224/12* (2013.01); *C22C 1/051* (2013.01); *Y10T 428/12458* (2015.01)

(56) References Cited

U.S. PATENT DOCUMENTS

2012/0282051 A1  11/2012  Mirchandani
2012/0321498 A1  12/2012  Mirchandani

* cited by examiner

ROD AND CUTTING TOOL

CROSS-REFERENCE TO RELATED APPLICATIONS

This application is a national stage entry of International Application No. PCT/JP2016/052324 under 35 U.S.C. §§ 365 and 371, filed on Jan. 27, 2016, which claims priority to Japanese Patent Application No. JP 2015-130004, which was filed on Jun. 29, 2015, Japanese Patent Application No. JP 2015-189048, which was filed on Sep. 26, 2015, and Japanese Patent Application No. JP 2015-229785, which was filed on Nov. 25, 2015. The disclosures of each of the foregoing documents are incorporated herein by reference in their entirety and for all purposes.

FIELD

The disclosure relates to a rod, and an elongated cutting tool such as a drill or an end mill.

BACKGROUND

Elongated rods are used as structural members. A rod is used in, for example, a cutting tool such as a drill or an end mill, which includes an elongated cylindrical rod called a blank on which cutting edges are formed. A drill for boring holes may be a solid drill, which includes a rod having flutes extending from the tip cutting edges. The solid drill is used, for example, for boring holes on a substrate onto which electronic components are to be mounted.

For example, Patent Literature 1 describes a drill blank that has compositions varying either radially or longitudinally.

CITATION LIST

Patent Literature

Patent Literature 1: Japanese Unexamined Patent Application Publication No. 2012-526664

SUMMARY

According to the disclosure, a rod includes cemented carbide member containing WC and Co. The rod is elongated and includes a first end portion and a second end portion in a longitudinal direction. The first end portion has a Co content $CO_{AC}$ and the second end portion has a Co content $Co_{BC}$. The Co content $Co_{AC}$ is smaller than the Co content $Co_{BC}$. The rod further includes a first portion on a side of the first end portion and a second portion on a side of the second end and portion. The first portion has a gradient $S_1$ representing a change in a Co content. The second portion has a gradient $S_2$ representing a change in a Co content. The gradient $S_1$ is greater than the gradient $S_2$.

According to the disclosure, a cutting tool includes a cemented carbide member containing WC and Co. The cemented carbide member is elongated and includes a first end portion and a second end portion in a longitudinal direction. The cemented carbide member further includes cutting edges at least on a side of the first end portion and a shank portion on a side of the second end portion. The first end portion has a Co content $Co_{AC}$ smaller than a Co content $Co_{BC}$ of the second end portion. The cemented carbide member further includes a first portion on a side of the first end portion and a second portion on a side of the second end portion. The first portion has a gradient $S_1$ representing a change in a Co content per millimeter. The second portion has a gradient $S_2$ representing a change in a Co content per millimeter. The gradient $S_1$ is greater than the gradient $S_2$.

DETAILED DESCRIPTION

Figure 1A:
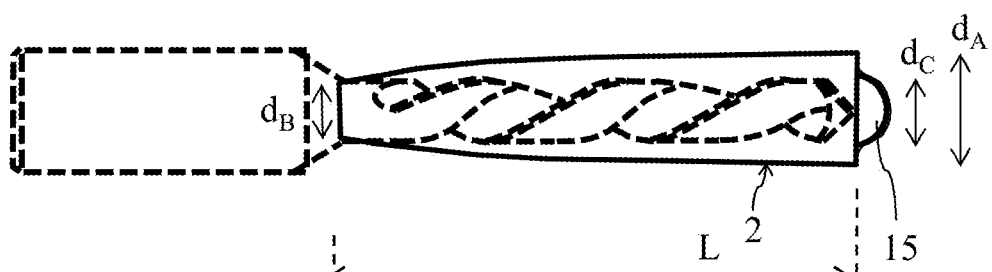
FIG. 1A is a side view of a cutting tool blank as an example of a rod according to the disclosure.
Figure 1B:
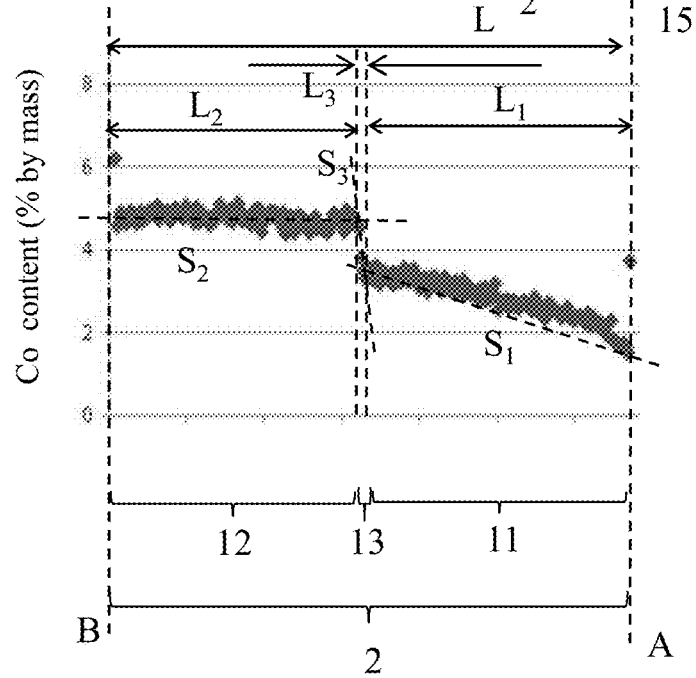
FIG. 1B is a graph showing the distribution of the Co content in the cutting tool blank in FIG. 1A.
Figure 2A:
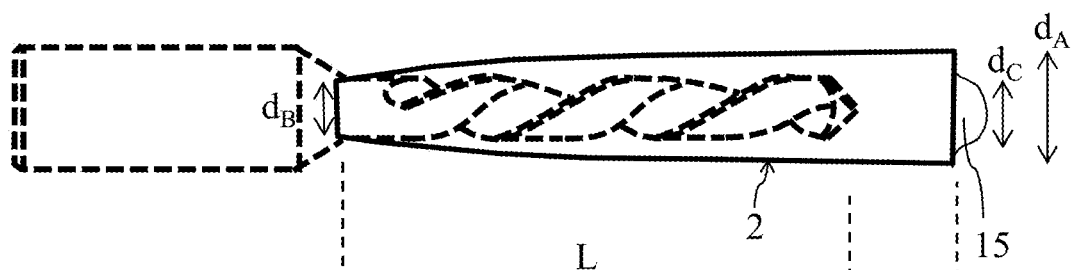
FIG. 2A is a side view of a cutting tool blank as another example of the rod according to the disclosure.
Figure 2B:
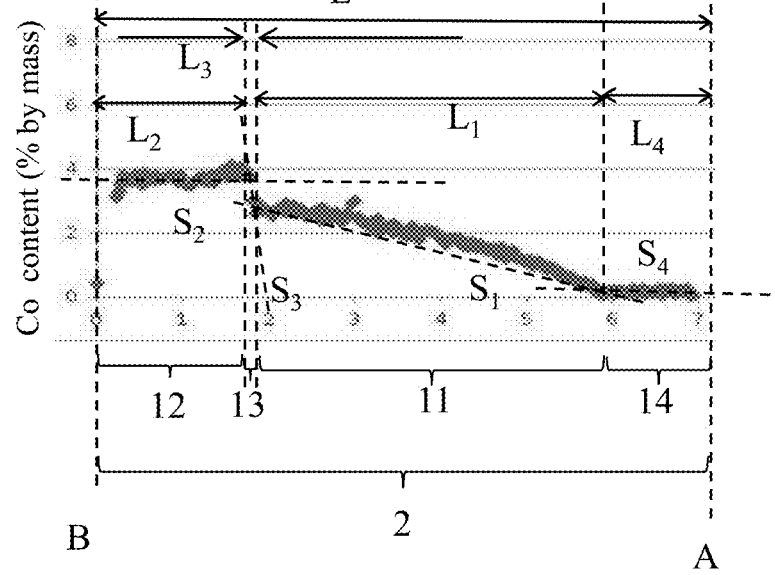
FIG. 2B is a graph showing the distribution of the Co content in the cutting tool blank in FIG. 2A.

A cutting tool blank as one example of a rod according to the disclosure will be described with reference to FIGS. 1A to 2B. FIGS. 1A and 2A are side views of the cutting tool blank as examples of the rod according to the disclosure. FIGS. 1B and 2B are graphs each showing the distribution of the Co content in the cutting tool blank. In FIGS. 1A and 1B, the dotted line indicates a drill that is formed by machining the cutting tool blank to have a first end (hereafter, part A) with cutting edges and a second end (hereafter, part B) connected to a shank.

A cutting tool blank (hereafter simply, the blank) 2 used for a drill 1 in the present embodiment includes a cemented carbide member. The cemented carbide member contains WC and Co. In FIG. 1A, the cemented carbide member is included in a blank 2. The blank 2 in FIG. 1A includes a body 10 and a protrusion 15. The blank 2 may have a coating layer (not shown) on its surface.

The blank 2, which is elongated and cylindrical, includes part A adjacent to one end in a longitudinal direction where cutting edges are formed, and part B adjacent to the other end in the longitudinal direction to be joined to the shank 3. The blank 2 may also contain, as well as WC and Co, carbides of metals in groups 4, 5, and 6 in the periodic table excluding W. The carbides of metals in groups 4, 5, and 6 in the periodic table may be $Cr_3C_2$, VC, TiC, TaC, NbC, and ZrC. In particular, the blank 2 including the cemented carbide member containing $Cr_3C_2$ has high corrosion resistance. For the cemented carbide member containing $Cr_3C_2$ and VC, the cemented carbide with a uniform particle size can be prepared in a stable manner by preventing abnormal growth of WC particles. The blank 2 including the cemented carbide member having a mean particle diameter less than 1.0 μm has high hardness and toughness.

In the present embodiment, the Co content $CO_{AC}$ in part A of the blank 2 is smaller than the Co content $Co_{BC}$ in part B. This allows part A with the cutting edges to have higher wear resistance, and enables a portion adjacent to part B, which is easily fractured in a cutting tool such as a drill or an end mill, to have higher fracture resistance. In the present embodiment, the blank 2 has a second portion 12 adjacent to part B and a first portion 11 adjacent to part A. The second portion 12 has a gradient $S_2$ representing changes in its Co content, and the first portion 11 has a gradient $S_1$ representing changes in its Co content. The gradient $S_1$ is greater than the gradient $S_2$. This allows a wide-range area adjacent to part B to have higher toughness, without reducing the high wear resistance in part A. The blank 2 thus has higher fracture resistance.

In the present embodiment, part A and part B refer to the ends of the blank 2, and these parts are specifically to be at positions where the composition of the blank 2 can be analyzed using an electron probe microanalyzer (EPMA). As shown in FIGS. 1B and 2B, the analysis using the EPMA in the ends of the blank 2 can inaccurately measure the composition when the measurement field partly deviates from the blank 2 because of the spot size. Thus, Part A and part B are to be at positions where the measurement can be performed.

The Co content $Co_{AC}$ may range from 0 to 10.0 percent by mass, and the Co content $Co_{BC}$ may range from 2.0 to 16.0 percent by mass. Under these conditions, the wear resistance and the fracture resistance of the blank 2 can be maintained high. Although more desirable ranges of $Co_{AC}$ and $Co_{BC}$ depend on the machining conditions, the Co content $Co_{AC}$ may range from 0.2 to 7 percent by mass, and the Co content $Co_{BC}$ may range from 2 to 12 percent by mass. For example, in a drill for processing a printed circuit board, the Co content $Co_{AC}$ may range from 1.0 to 4.9 percent by mass, and the Co content $Co_{BC}$ may range from 5.0 to 10.0 percent by mass. The conventional uniform composition cannot easily allow densification of cemented carbide having a Co content of less than 5 percent by mass. More specifically, after fired, the blank 2 has a Co aggregation depending on the particle diameter and the degree of aggregation of the Co material powder. The Co aggregation causes ununiform Co distribution. In the present embodiment, however, the capillary action of Co causes Co diffusing, and thus a Co aggregation cannot easily occur. This allows a uniform Co distribution. Thus, a cemented carbide member adjacent to part A with a small Co content can be densified.

The ratio $Co_{AC}/Co_{BC}$ of the Co content $Co_{AC}$ to the Co content $Co_{BC}$ ranges from 0.2 to 0.7. The ratio in this range improves the hardness in part A, and increases the fracture resistance of the blank 2. The ratio $Co_{AC}/Co_{BC}$ can be determined by measuring the composition in each portion across the longitudinal section of the blank 2 through the EPMA analysis. The longitudinal section is obtained by splitting the blank 2 in half. The composition analysis of part A and part B is performed along the central axis of the longitudinal section.

The gradients $S_1$ and $S_2$ represent the rate of change in the Co content in the longitudinal direction. To determine the change in the composition of the blank 2 in the longitudinal direction, the Co content distribution in the blank 2 in the longitudinal direction is measured through an EPMA analysis, and the first portion 11 and the second portion 12 are identified. The gradient $S_1$ and the gradient $S_2$ are calculated from the inclinations obtained by approximating the distribution in each portion using the method of least squares. Downward inclinations from part A to part B are defined as an increase in the Co content, whereas upward inclinations from part A to part B are defined as a decrease in the Co content.

When the gradient $S_1$ ranges from 0.2 to 1.0 percent by mass per millimeter, and the gradient $S_2$ ranges from 0 to 0.2 percent by mass per millimeter, the blank 2 may have an increased hardness in part A, as well as an increased fracture resistance. The gradient $S_1$ may not be constant within the first portion 11. In particular, as the gradient within the first portion 11 increases its inclination toward part A, the wear resistance in part A and the fracture resistance of the blank 2 increase.

The blank 2 may have a diamond-coating layer (not shown) on its surface. The content Co at the surface of the first portion 11, which can prevent the growth of diamond crystals, is small, and thus the diamond-coating layer on the first portion 11 has higher crystallinity. The diamond-coating layer thus has improved hardness and adhesion.

Additionally, the blank 2 may have a third portion 13 between the second portion 12 and the first portion 11. The third portion 13 may have a gradient $S_3$ greater than the gradient for the first portion 11. In this case, the gradient $S_1$ for the first portion 11 and the gradient $S_2$ for the second portion 12 are easy to control. The control enables a portion adjacent to part B, which is easily fractured, to have still higher fracture resistance. The gradient $S_3$ of 2 to 50 percent by mass per millimeter increases the wear resistance of a portion adjacent to part A and the fracture resistance of a portion adjacent to part B.

Additionally, the blank 2 may have a fourth portion 14 near part A than the first portion 11 as shown in FIGS. 2A and 2B. The fourth portion 14 may have a gradient $S_4$ smaller than the gradient $S_1$. In this case, a wear-resistant area adjacent to part A may be larger. For a gradient $S_4$ of 0 to 0.5 percent by mass per millimeter and the Co content in the fourth portion 14 of 0 to 0.6 percent by mass, the diamond-coating layer on the surface of the blank 2 has still higher crystallinity on the part corresponding to the fourth portion 14. The diamond-coating layer thus has improved hardness and adhesion in this area. The boundary between the first portion 11 and the fourth portion 14 has an inflection point in the Co content distribution.

The longitudinal length of the first portion 11 is $L_1$, the longitudinal length of the second portion 12 is $L_2$, the longitudinal length of the third portion 13 is $L_3$, and the longitudinal length of the fourth portion 14 is $L_4$. In the ratio $L_1/L_2$ of 0.2 to 5.0, the hardness in part A is improved, and the fracture resistance of the blank 2 is increased. For the drill 1 used as a micro drill for processing printed circuit boards, the ratio $L_1/L_2$ may range from 0.2 to 5.0, the Co content $CO_{AC}$ may range from 0.3 to 8.0 percent by mass, and the Co content $Co_{BC}$ may range from 2.5 to 15.0 percent by mass.

In the ratio $L_3/L_2$ of 0.01 to 0.1, the Co content in the second portion 12 and the Co content in the first portion 11 can be adjusted easily. In the ratio $L_4/L_2$ of 0 to 0.05, the cemented carbide member in part A is densified easily in a more stable manner. When the ratio $L_4/L_2$ is greater than 0.05 and the fourth portion 14 is partially not densified, at least a part in the fourth portion 14 may be ground away in forming the drill 1.

The corners in part A of the longitudinal section obtained by splitting the blank 2 in half correspond to the outer periphery in part A. The blank having the Co content $CO_{AO}$ in the outer periphery in part A smaller than the Co content $Co_{AC}$ of the center of part A may have an increased wear resistance on its outer periphery, which can most easily wear in the cutting edges of a rotary tool such as a drill or an end mill.

The Co content in the outer periphery of part A is $Co_{AO}$. The Co content $Co_{AO}$ may range from 0.1 to 6.5 percent by mass, and the ratio $Co_{AO}/Co_{AC}$ of the Co content $Co_{AO}$ to the Co content $CO_{AO}$ may range from 0.1 to 0.9. Under these conditions, the wear resistance of the cutting edges of a cutting tool is improved, and fractures in the center of the cutting tool tip are prevented.

When the diameter $d_A$ of the blank 2 in part A and the diameter $d_B$ in part B are both 2 mm or less, and the longitudinal length of the blank 2 is defined as L, the blank with the ratio $L/d_A$ of the length L to $d_A$ being 3 or more is difficult to form by extrusion. More specifically, changing the Co contents in part A and part B is difficult, and forming the protrusion 15 is also difficult. However, the blank 2 having this shape can be formed by pressing. The manufacturing conditions such as the shape of the mold and the firing conditions are optimized to reduce fractures in the mold and a compact and also control the composition and the shape of the fired blank to fall within predetermined limits.

In the ratio $L/d_A$ of 3 or more, the Co contents $Co_{AC}$ and $Co_{BC}$ in the fired blank 2 can be easily adjusted to have a predetermined proportion. At a smaller ratio $L/d_A$, the Co diffusing during the firing process can offset the difference between $Co_{AC}$ and $Co_{BC}$ in the blank 2. The ratio $L/d_A$ may desirably be 4 to 10.

The blank 2 with the diameters $d_A$ and $d_B$ of 0.2 to 2 mm, and the length L of 3 to 20 mm is appropriate for a drill for processing printed circuit boards. In particular, the diameter $d_A$ may range from 0.3 to 1.7 mm. In other applications, the diameter $d_A$ may be greater than 2 mm. In that case, the diameter $d_A$ may range from 0.2 to 20 mm, and the length L may be 3 to 50 mm.

Figure 3:
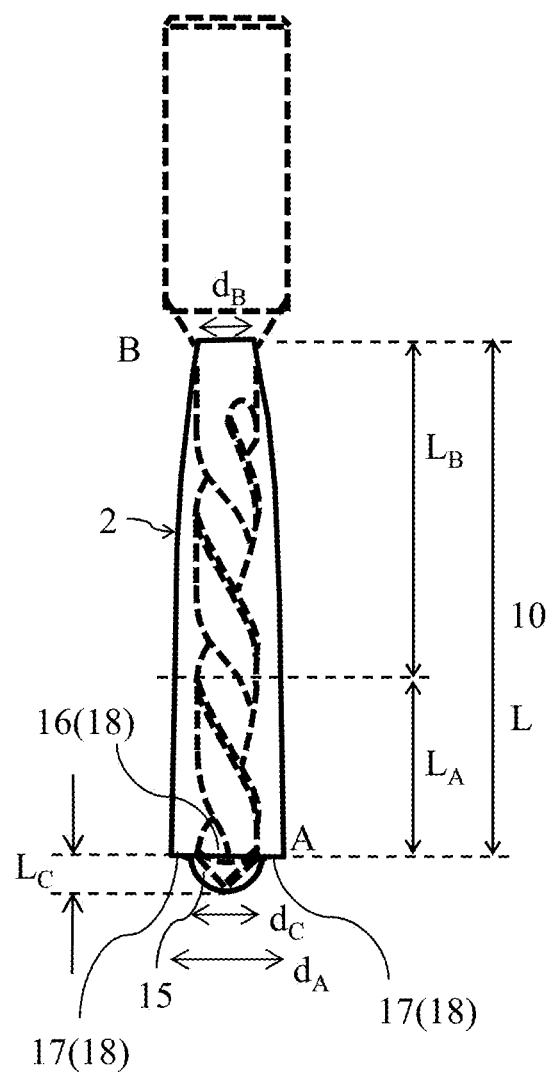
FIG. 3 is a side view of a cutting tool blank as still another example of the rod according to the disclosure.

In the present embodiment, the ratio $d_A/d_B$ may range from 1.02 to 1.20 as shown in FIG. 3. In this case, part A and part B can be easily distinguished from each other based on the dimensional difference between part A and part B, which have different Co contents. The cutting edges of the cutting tool can thus be formed in part A in a reliable manner. The cutting tool can be obtained at a lower grinding cost because the ratio $d_A/d_B$ is 1.20 or less, and thus the machining cost can be reduced. In some embodiments, the ratio $d_A/d_B$ may range from 1.03 to 1.10.

In FIG. 3, an area a includes part A and has the ratio of its diameter to the diameter of part A being 0.95 or more, and an area b includes part B and has the ratio of its diameter to the diameter of part A being less than 0.95. Under the conditions, the ratio $L_A/(L_A+L_B)$ may range from 0.3 to 0.6, where $L_A$ is the longitudinal length of the area a, and $L_B$ is the longitudinal length of the area b. In this range, the cutting edges of the drill 1 can maintain high wear resistance after being ground again, and the flutes can have higher fracture resistance. The ratio $L_A/(L_A+L_B)$ may range from 0.3 to 0.5.

The diameter across the area a decreases continuously from the diameter $d_A$ of part A toward the diameter $d_B$ of part B, which is the other end. The diameter decreasing continuously refers to the diameter changing without steps indicating discontinuous changes. This prevents fractures in the blank 2.

The fired blank 2 may not be ground. However, the outer peripheral surface of the fired blank 2 may undergo centerless grinding to increase the accuracy of positioning in holding the blank 2 during the process for joining the blank 2 to the shank 3.

In FIGS. 1A to 2B, the protrusion 15 is formed at a position longitudinally outward from the end of the blank 2 adjacent to part A. The protrusion 15 has a smaller diameter than the blank 2. The protrusion 15 protrudes from a first end face 18 of the body 10. The first end face 18 includes a protrusion area 16 having the protrusion 15, and a circumferential area 17 along the circumference of the protrusion area 16. In other words, the area of the protrusion 15 in contact with part A has a diameter $d_C$ smaller than the diameter $d_A$ of part A. The protrusion 15 allows part A and part B of the blank 2 to be distinguished more easily.

The ratio $d_C/d_A$ between the diameters $d_C$ and $d_A$ may range from 0.5 to 0.9. In this range, fractures in the compact for the blank 2 are prevented in the processes for manufacturing the blank 2. As shown in FIG. 3, the protrusion 15 has a height $L_C$. The height $L_C$ may be 5 to 20% of the full length L of the blank 2.

The protrusion 15 can be formed easily. The tip of the drill 1 with cutting edges may be formed by the protrusion 15 to save the machining cost.

Figure 4:
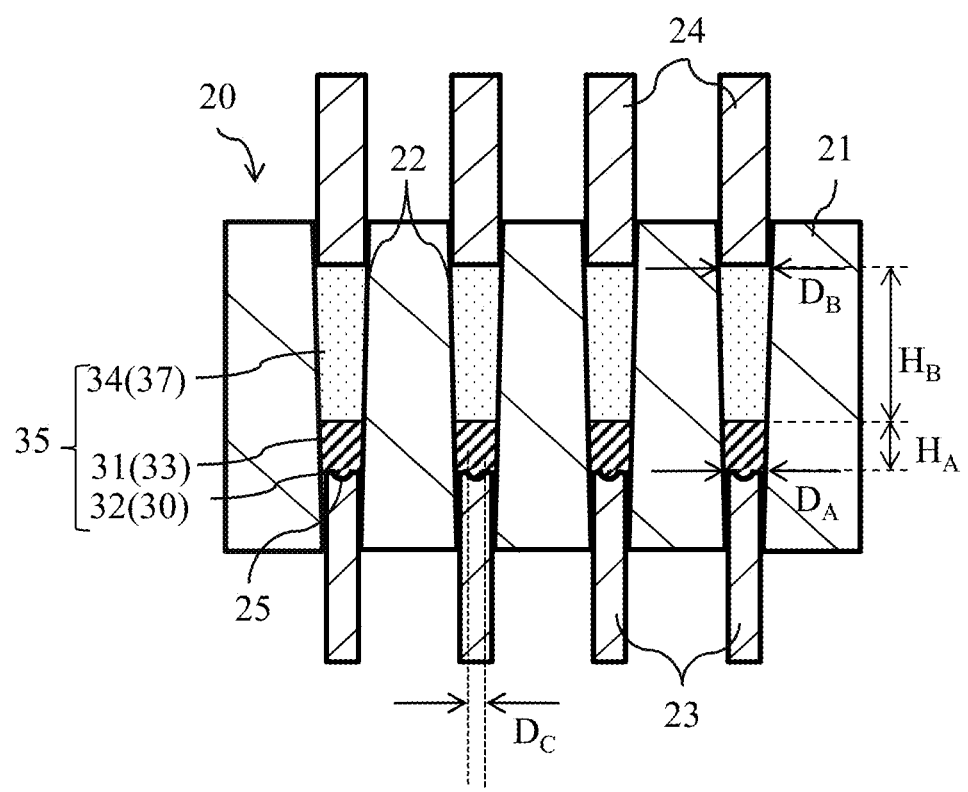
FIG. 4 is a schematic diagram of a mold used in a method for molding the cutting tool blank shown in FIG. 1A.

The protrusion 15 is tapered. In particular, the protrusion 15 may have a round tip. The protrusion 15 is hemispherical in FIGS. 1A to 3. This protrusion 15 is prevented from chipping and also from damaging other blanks 2 when the blanks 2 randomly placed into a joining machine may collide with one another. In the present embodiment, the bottom of the protrusion 15 in contact with part A has a round surface in a longitudinal section. FIG. 4 is a schematic diagram of a mold used in a method for molding the cutting tool blank according to the present embodiment. The bottom of each protrusion 15 in contact with part A has the round surface in a longitudinal section. This prevents a lower punch 23 from receiving a concentrated load and chipping during molding of a compact 35.

The protrusion 15 according to a first embodiment has the Co content $Co_{CC}$ smaller than the Co content $CO_{AC}$ in part A. In this case, the cutting edges of the drill 1 formed from the protrusion 15 and part A have high wear resistance. Part B, which has a high Co content, has high toughness. The flutes of the drill 1 formed in a portion adjacent to part B has high fracture resistance. Thus, the cutting tool in the present embodiment using the blank 2 has high wear resistance in its cutting edges, and also has high fracture resistance. In this structure, the cutting edges 5 formed from the protrusion 15 or part A only also have high wear resistance. The drill 1 including the cutting edges 5 with tips formed from the protrusion 15 has high straightness in boring holes, and thus has higher accuracy in boring holes.

For the protrusion 15 according to the first embodiment, the Co content in the center of part A is $Co_{AC}$, the Co content in the center of part B is $Co_{BC}$, and the Co content in the tip of the protrusion 15 is $Co_{CC}$. The Co content $Co_{AC}$ may range from 0.2 to 7 percent by mass, the Co content $Co_{BC}$ may range from 2 to 12 percent by mass, the Co content $Co_{CC}$ may range from 0.1 to 6 percent by mass, the ratio $Co_{AC}/Co_{BC}$ of the Co content $Co_{AC}$ to the Co content $Co_{BC}$ may range from 0.1 to 0.6, and the ratio $Co_{CC}/Co_{AC}$ of the Co content $Co_{CC}$ to the Co content $Co_{AC}$ may range from 0.1 to 0.8. Within these ranges, the drill 1 has high fracture resistance and includes the cutting edges with high wear resistance. Further, the cutting edges 5 at least with their tips formed from the protrusion 15 increase the accuracy in boring holes.

The protrusion 15 according to a second embodiment has the Co content $Co_{CC}$ greater than the Co content $Co_{AC}$ in part A. In this case, the protrusion 15 has a high Co content and low hardness, and thus the protrusion 15 may be easily ground away in forming a drill using the blank 2.

In the present embodiment, the Co content in the center of part A is greater than the Co content in the outer periphery of part A. Thus, a rotary tool such as an end mill (not shown) including the blank 2 has a cutting tool tip having the cemented carbide hardness that is lower in the central area at and near the center of rotation. For the cutting tool tip with its central area containing a low-hardness material, the cutting speed is nearly zero at or near the center of rotation of the cutting tool. This prevents fractures in the center of the end mill tip when the cutting tool rubs against a workpiece.

For the protrusion 15 according to the second embodiment, the Co content $Co_{AC}$ may range from 0.2 to 7 percent by mass, the Co content $Co_{BC}$ may range from 3 to 12 percent by mass, the Co content $Co_{CC}$ may range from 2 to 12 percent by mass, the ratio $Co_{AC}/Co_{BC}$ of the Co content $Co_{AC}$ to the Co content $Co_{BC}$ may range from 0.1 to 0.6, and the ratio $Co_{CC}/Co_{AC}$ of the Co content $Co_{CC}$ to the Co content $Co_{AC}$ may range from 1.2 to 3. Within these ranges, the end mill has high fracture resistance and includes the cutting edges with high wear resistance. Further, the protrusion 15 may be easily ground away when the end mill is machined.

The Co contents $CO_{AC}$, $CO_{AO}$, $CO_{BC}$ and $Co_{CC}$ can be determined by measuring the composition in each portion in the longitudinal direction of the blank 2 using the EPMA analysis. The longitudinal section is obtained by splitting the blank 2 in half. To determine the change in the composition of the blank 2 in the longitudinal direction, an electron microscope observation is performed along a side surface of the blank 2 while the measurement position is being shifted in a stepwise manner. The composition in each portion is measured through the EPMA analysis to determine the change in the composition.

Although the present embodiment describes a drill as a cutting tool for boring holes in printed circuit boards, the disclosure may be directed to any tool having an elongated body. For example, the disclosure may be directed to a metalworking drill, a medical drill, an end mill, and a cutting tool for turning, such as an indexable insert for inner diameter machining. The rod such as the blank 2 may be used not only for a cutting tool, but also as a wear-resistant member and a sliding member. For example, the rod may also be used as a punch. For applications other than cutting tools, the rod may also be processed into a predetermined shape, and an area including part A may be placed in contact with the target material while part B is fixed.

Method for Manufacturing Blank

A method for manufacturing the cutting tool blank described above will now be described. First, material powders such as WC powder are mixed to prepare cemented carbide for a blank and a cutting tool. In the present embodiment, three material powders are mixed.

More specifically, the mixed material powders prepared include a first material powder containing WC powder for forming a protrusion, a second material powder containing WC powder for forming a portion adjacent to part A, and a third material powder containing WC powder and Co powder for forming a portion adjacent to part B. The second material powder may also contain Co powder in addition to WC powder. However, the second material powder has a smaller Co content smaller than the third material powder. The mass ratio of the Co powder content in the second material powder to the Co powder content in the third material powder is 0 to 0.5, and specifically 0 to 0.3. In addition to WC powder and Co powder, the first material powder, the second material powder, and the third material powder may also contain any additive of the powders of carbides, nitrides, and carbonitrides of the metals in groups 4, 5, and 6 in the periodic table excluding WC.

When no protrusion is to be formed, the first material powder is eliminated. When a protrusion having the Co content $Co_{CC}$ smaller than the Co content $CO_{AC}$ in part A is to be formed, the first base material powder may be replaced by the second base material powder.

For forming a protrusion having the Co content $Co_{CC}$ greater than the Co content $CO_{AC}$ in part A, the first material powder contains Co powder in addition to WC powder, and the Co powder content in the first material powder is greater than the Co powder content in the second material powder.

For forming a protrusion having the Co content $Co_{CC}$ greater than the Co content $CO_{AC}$ in part A, the mixture proportion of the WC powder in the first material powder may range from 65 to 95 percent by mass, the mixture proportion of the Co powder may range from 3 to 30 percent by mass, and the mixture proportion of the additives may range from 0 to 5 percent by mass in total. The mixture proportion of the WC powder in the second material powder may range from 90 to 100 percent by mass, the mixture proportion of the Co powder may range from 0 to 8 percent by mass, and the mixture proportion of the additives may range from 0 to 5 percent by mass in total. The mixture proportion of the WC powder in the third material powder may range from 65 to 95 percent by mass, the mixture proportion of the Co powder may range from 4 to 30 percent by mass, and the mixture proportion of the additives may range from 0 to 10 percent by mass in total.

A binder and a solvent are added to the material powders to obtain slurry. This slurry is granulated, and the resultant granules are used as a powder to be used for molding. For ease of explanation, a protrusion having the Co content $Co_{CC}$ greater than the Co content $CO_{AC}$ in part A is formed in the molding process described below.

In the molding process, a press mold (hereafter simply, the mold) 20 is prepared, and the granules are placed into cavities 22 in a die 21 of the mold 20 as shown in FIG. 4. The granules placed in each cavity 22 in the die 21 are pressurized by lowering an upper punch 24 to form a compact. In the present embodiment, the bottoms of the cavities 22 are defined by the upper surfaces of lower punches 23, which serve as the press surfaces. Each upper surface has a hollowed space 25 for forming the protrusion 15. The diameter $D_C$ of the compact 35 at the position of the contact between a raw protrusion 32 and a compact lower part 31 corresponds to the diameter of the opening for the raw protrusion 32. The ratio $D_C/D_A$ of the diameter $D_C$ to the upper surface diameter of the lower punch $D_A$ may range from 0.5 to 0.9. This reduces stress concentration during the pressurization, and prevents fractures in the lower punch 23.

The molding method includes placing the first material powder 30 into the hollowed space 25 included in the cavity 22; placing the second material powder 33 into the cavity 22; placing the third material powder 37 into the cavity 22; lowering the upper punch 24 from above to pressurize the first material powder 30, the second material powder 33, and the third material powder 37 placed in the cavity 22 in the die 21; and releasing the layered compact 35 from the mold 20.

The compact 35 is elongated and cylindrical, and has the Co content in part A smaller than the Co content in part B. Thus, the blank 2 has a predetermined Co content distribution. Adjusting the Co content in part C allows the Co content in part A of the fired blank 2 at the center and along the outer periphery to fall within predetermined limits.

Other molding methods may be used. One such method includes placing the first material powder 30 and the second material powder 33, and then first pressurizing these material powders. This is then followed by placing the third material powder 37 on the upper surface of the compact, and then repressurizing the compact. Another method includes placing the first material powder 30, the second material powder 33, and the third material powder 37 into the hollowed space 25 in the cavity 22, and then lowering the upper punch 24 from above to pressurize the first material powder 30, the second material powder 33, and the third material powder 37 placed in the cavity 22 in the die 21 together.

The round bottom of the hollowed space 25 can prevent the raw protrusion 32 of the compact 35 from chipping, and reduce variations in the Co content in the protrusion 15 of the fired blank 2 to prevent locally poor sintering of the compact.

To obtain a sintered body having a diameter of 2 mm or less in the present embodiment, an additional load is applied to the upper punch 24 to lower the upper punch 24 by 0.1 to 2 mm, or 0.1 to 20% of the length of the compact, from the position of the upper punch 24 held during the pressurization, and also the load on the lower punch 23 is reduced. Under these molding conditions, the unevenness of pressure in the compact 35 can be reduced, the lower punch 23 can be prevented from being fractured when the compact 35 is released, and the blank 2 obtained by firing the compact 35 can have a predetermined shape.

More specifically, when the compact 35 for forming a sintered body with a diameter of greater than 2 mm is to be formed by pressing, the granules, or powder, are homogeneously placed into the mold 20. With the conventional method for forming the compact 35 to obtain a sintered body with a diameter of 2 mm or less by pressing, the granules, or powder, can be placed inhomogeneously into the mold. In the present embodiment, the molding conditions are controlled to form the compact 35, and then to form the blank 2 having a predetermined shape.

As shown in FIG. 4, the diameter $D_A$ of the compact 35 adjacent to the lower punch 23 may be smaller than the diameter $D_B$ adjacent to the upper punch 24. For the compact resulting from the molding described above, the ratio $D_A/D_B$ in the present embodiment may range from 0.80 to 0.99. The ratio $d_A/d_B$ in this range can be controlled to be within intended limits. More specifically, the ratio $d_A/d_B$ can be controlled to be within intended limits based on the difference in firing shrinkage between part A and part B during firing. The ratio $H_A/(H_A+H_B)$ may range from 0.2 to 0.7, where $H_A$ is the height of the second material powder 33 in the compact 35, and $H_B$ is the height of the third material powder 37. The compact may include another material powder such as a fourth material powder, for example, between the second material powder 33 and the third material powder 37. The fourth material powder may have a Co powder content falling between the Co powder contents in the second material powder 33 and the third material powder 37.

To increase the manufacturing efficiency and to prevent the upper punch from lowering in an inclined direction, the mold includes multiple sets of the upper punch, the recess, and the lower punch, which allow multiple compacts to be molded at a time. For example, the mold may include 4 to 144 sets of the upper punch, the recess, and the lower punch. As viewed from the side, the mold may also have the upper punches and the lower punches that each have the same diameter and are straight. In some embodiments, a portion adjacent to the lower punch, which is more subject to pressure than a portion adjacent to the upper punch, shrinks less when fired. This difference in shrinkage may be reflected in using the mold 20, or specifically the powder filling portion (recess) 22 in the die 21 is filled with granules, and the granules are pressed between the upper punch 24 and the lower punch 23 by pressurization. With the dimensional ratio $d_A/d_B$ between the portion adjacent to the upper punch and the portion adjacent to the lower punch falling within predetermined limits, the diameter $D_A$ adjacent to the lower punch 23 may be smaller than the diameter $D_B$ adjacent to the upper punch 24 in the mold 20 as shown in FIG. 4. Under these conditions, the lower punch 23 is prevented from receiving a concentrated load on its periphery to prevent fractures in the lower punch 23.

The compact is then released from the mold and undergoes sinter hot isostatic pressing (sinter-HIP) firing to form the blank 2. The firing process in the present embodiment uses a temperature rise rate of 4 to 20° C./min, a firing temperature of 1350 to 1580° C., and a firing time period of 15 to 45 minutes. Under the conditions, the Co contents in part A and part B can be easily adjusted. The differing degrees of sintering between the second material powder 33 and the third material powder 37 cause part A and part B to have different shrinkages during the firing process. As a result, the compact is deformed, and the shrinkage of part B exceeds the shrinkage of part A. More specifically, the firing causes Co in part B to partly diffuse to part A, causing part B to shrink more than part A. In this manner, the sintered body can be controlled to have an intended shape. The protrusion 15 is located to cause Co to diffuse less than in part A. The Co content $Co_C$ in the protrusion 15 is thus smaller than the Co content $CO_A$.

Additionally, the differing degrees of sintering between the second material powder 33 and the third material powder 37 cause part A and part B to have different shrinkages during the firing process. As a result, the compact is deformed, and the shrinkage of part B exceeds the shrinkage of part A. More specifically, the firing causes Co in part B to partly diffuse to part A, causing part B to shrink more than part A. In the sintered body, the diameter of part B thus tends to be smaller than the diameter of part A.

At the temperature rising rate smaller than 4° C./min, Co can diffuse excessively during the firing process. In this case, the Co concentration difference in the sintered blank 2 tends to be small, and the gradient $S_1$ for the first portion 11 becomes smaller than the gradient $S_2$ for the second portion 12, or the Co contents $Co_{AC}$ and $Co_{BC}$ become equal to each other. At the temperature rise rate higher than 20° C./min, the gradient $S_1$ for the first portion 11 becomes equal to or smaller than the gradient $S_2$ for the second portion 12. Part A can be insufficiently densified. Under the reduced pressure smaller than 50 Pa at the firing temperature, Co can diffuse excessively during the firing process, and the Co concentration in the sintered body becomes uniform. In this case, the gradient $S_1$ for the first portion 11 becomes equal to or smaller than the gradient $S_2$ for the second portion 12 or the Co contents $Co_{AC}$ and $Co_{BC}$ become equal to each other. Under the reduced pressure higher than 200 Pa, the gradient $S_1$ for the first portion 11 becomes equal to or smaller than the gradient $S_2$ for the second portion 12, and part A may be insufficiently densified. When the difference between the sinter-HIP processing temperature and the sintering temperature is 5° C. or less, the gradient $S_1$ for the first portion 11 is equal to or smaller than the gradient $S_2$ of the second portion 12 or the Co contents $Co_{AC}$ and $Co_{BC}$ become equal to each other.

With the method for manufacturing the blank 2 according to the present embodiment, the blank 2 is molded by pressing, and thus the blank 2 is easily formed through a fewer molding processes. Further, the blank 2 can have accurate dimensions with small dimensional changes between the compact for the blank 2 and the fired blank 2. Thus, the blank 2 is shaped to have small machining allowance against the shape of the drill 1. The blank 2 formed by pressing can have a smaller amount of binder added during the molding than a blank 2 to be formed by extrusion. The resultant blank 2 is a highly reliable component with less defects such as voids and carbon residues in the sintered body (blank 2). In the process for molding the blank 2, the unevenness of density in the compact can be regulated to allow stable molding with less chipping or other defects.

For the blank 2 having a diameter $d_A$ of 2 mm or less, the compact formed by pressing can involve density variations. Due to this, the cemented carbide can sinter faster in the ends of the blank 2 (parts A and B) than in the middle portion C. For the compact with the diameter $D_B$ greater than the diameter $D_A$, the cemented carbide sinters faster in part A than in part B. In the present embodiment, the state of the granules used in the molding is adjusted. Additionally, after the pressurization using the upper and lower punches, an additional load is applied using the upper punch 24 to prevent the mold from being fractured and to adjust the density of the compact in the two ends of the blank 2. This reduces the dimensional difference between part A and part B of the fired blank 2 to reduce the machining allowance.

The molding process according to the disclosure is not limited to the pressing described above. Examples of other molding techniques include cold isostatic pressing, dry-bag isostatic pressing, and injection molding.

Method for Manufacturing Cutting Tool

A method for manufacturing a drill for processing printed circuit boards using the blanks 2 obtained through the above processes will now be described. Tens or hundreds of blanks 2 are randomly placed into a joining machine. In the joining machine, the blanks 2 are aligned longitudinally. When the blanks 2 each have the protrusion 15, the protrusion 11 is detected using image data or other data, and part A and part B of the blank 2 are identified. Using the identified parts A and B, the blanks 2 can be automatically aligned to have their parts A and B arranged in a predetermined direction.

Figure 5:
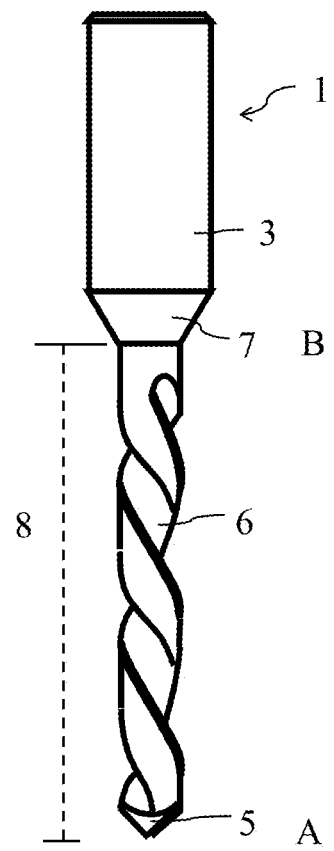
FIG. 5 is a side view of an example drill obtained by joining the cutting tool blank shown in FIG. 1A to a shank and forming cutting edges in the blank.

Each of the blanks aligned with one another is then automatically placed in contact with a predetermined portion of a neck 7, which is connected to a separately prepared shank 3, and then undergoes joining using a laser. The joined blank 2 then undergoes the cutting edge formation. In this state, as shown in FIG. 5, the drill 1 includes part A adjacent to the cutting edges 5, and part B adjacent to the shank 3 of the drill 1.

Cutting Tool

The blank 2 then undergoes the process for forming cutting edges to complete the cutting tool, such as the drill 1. The drill 1 in FIG. 5 includes a body 8 including cutting edges 5 in part A, flutes 6 extending from the cutting edges, and a neck 7. The cutting edges 5 and the flutes 6 correspond to a processing part. The drill 1 also includes a shank 3 adjacent to the body 8. The cutting edges 5, which first come in contact with a workpiece material while rotating about the central axis, need to have high chipping resistance and wear resistance. The flutes 6 can clear away chips, resulting from machining, rearward. The neck 7 smoothly connects the processing diameter (the diameter of the flutes 6) of the drill 1 to the diameter of the shank 3. The shank 3 is used to fix the drill 1 to a processing machine.

The drill 1 obtained by the method described above includes the processing part including the cemented carbide cutting edges 5 and the flutes 6. In the present embodiment, the maximum diameter of the processing part may be 2 mm or less.

Additionally, the surface of the drill 1 may be covered with a coating layer (not shown) as appropriate. The coating layer may be TiN, TiCN, TiAlN, diamond, and diamondlike carbon formed by physical vapor deposition (PVD), and diamond formed by chemical vapor deposition (CVD).

The neck 7 and the shank 3 may be formed from an inexpensive material such as steel, alloy steel, or stainless steel, and the blank 2 may be joined to the tip of the neck 7. In the drill 1, the section from the cutting edges 5 to the shank 3 may be formed using the blank. In some embodiments, the drill 1 may eliminate the neck 7.

In the present embodiment, to measure the mean particle diameter of the WC particles in part A and part B, the field of view in which 10 or more WC particles are observed is defined in part A or part B, and the mean particle diameter of the WC particles is measured in the defined field of view. The mean particle diameter of the WC particles in the field of view may also be calculated by converting the area of each observed WC particle into a circle, and calculating the average of the diameters of the circles representing the WC particles.

The neck 7 and the shank 3 may be formed from an inexpensive material such as steel, alloy steel, or stainless steel, and the blank 2 may be joined to the tip of the neck 7. In the drill 1, the section from the cutting edges 5 to the shank 3 may be formed using the blank 2. In some embodiments, the drill 1 may eliminate the neck 7. Additionally, the cutting tool may not be the drill 1, and may be used for, for example, a device with a rotation axis, such as an end mill or a reamer.

Example 1

Two types of powder mixtures, which are first material powders and second material powders in Table 1, were prepared by mixing cobalt (Co) metal powder, chromium carbide ($Cr_3C_2$) powder, vanadium carbide (VC) powder, and the remainder that is tungsten carbide (WC) powder with a mean particle diameter of 0.3 μm at the proportions shown in Table 1. Additives including a binder and a solvent were added to each powder mixture to obtain slurry, which was then granulated with a spray dryer to produce granules with a mean particle diameter of 70 μm.

The mold shown in FIG. 3 including the die having 144 recesses was prepared. The first material powders shown in Table 1 were placed in the mold, and then the second material powders shown in Table 1 were placed in the mold, and then the mold underwent pressing. This forms compacts each including the first material powder, and the second material powder stacked on the first powder. The compacts were released from the mold. The shape of each compact is defined using a diameter $D_A$ of a portion adjacent to the lower punch, a diameter $D_B$ of a portion adjacent to the upper punch, a length $H_A$ of a lower part of the compact, and a length $H_B$ of an upper part of the compact as shown in Table 1.

The compacts were heated at temperature rising from 1000° C. at the temperature rise rates shown in Table 2, and then fired for one hour under the atmospheres and the firing temperatures shown in Table 2. Then, the temperatures were changed to sinter-HIP temperatures (HIP in the table) shown in Table 2. The compacts then underwent sinter-HIP processing under a pressure of 5 MPa for 30 minutes.

The length of each resultant blank was measured by measuring the diameters of part A and part B of the blank. Table 2 shows the results ($d_A$ and $d_B$). Each blank was longitudinally split in half. The changes in the Co content across the section from part A to part B were then measured through the EPMA analysis to detect the second to fourth portions, the gradients, and the lengths. For part A of each blank, the Co content along the outer periphery was measured. Tables 2 and 3 show the results.

After the outer periphery of each blank underwent centerless grinding, the blanks were randomly placed into a joining machine. In the joining machine, the protrusion of each blank was detected, and the blanks were aligned to have their parts A and parts B of the bodies arranged in the same directions. The second end of the blank was placed in contact with and joined to a shank, and cutting edges were formed in a section including the first end of the blank to complete the drill.

The resultant drills were tested for drilling under the conditions described below. Table 3 shows the results.

Drilling Test Conditions

Workpiece material: FR4 material, 0.8 mm thick, three-layer stack

Drill shape: φ0.25 mm

Revolutions: 160 krpm

Feeding speed: 3.2 m/min

Evaluation items: the number of successfully bored pieces and the flank wear width (μm) of the tested drill

TABLE 1

| Sample No. | First material powder | | | Second material powder | | | Compact size | | | | | |
|---|---|---|---|---|---|---|---|---|---|---|---|---|
| | Co added (mass %) | Additive | Added (mass %) | Co added (mass %) | Additive | Added (mass %) | $D_A$ (mm) | $D_B$ (mm) | $D_A/D_B$ | $H_A$ (mm) | $H_B$ (mm) | $H_A/(H_A + H_B)$ |
| I-1 | — | $Cr_3C_2$ VC | 0.2 0.1 | 8.0 | $Cr_3C_2$ VC | 0.6 0.3 | 1.58 | 1.63 | 0.97 | 5.5 | 5.5 | 0.5 |
| I-2 | — | $Cr_3C_2$ VC | 0.3 0.1 | 8.0 | $Cr_3C_2$ VC | 0.5 0.3 | 1.58 | 1.63 | 0.97 | 2.5 | 8.5 | 0.2 |
| I-3 | — | $Cr_3C_2$ VC | 0.2 0.1 | 8.0 | $Cr_3C_2$ VC | 0.4 0.3 | 1.58 | 1.63 | 0.97 | 8.5 | 2.5 | 0.8 |
| I-4 | 2.0 | VC | 0.2 | 8.0 | $Cr_3C_2$ VC | 0.2 0.4 | 2.35 | 2.35 | 1.00 | 5.5 | 5.5 | 0.5 |
| I-5 | — | — | — | 8.0 | $Cr_3C_2$ VC | 0.6 0.3 | 1.28 | 1.35 | 0.95 | 5.5 | 5.5 | 0.5 |
| I-6 | — | $Cr_3C_2$ VC | 0.2 0.1 | 8.0 | $Cr_3C_2$ VC | 0.6 0.3 | 1.58 | 1.63 | 0.97 | 5.5 | 5.5 | 0.5 |
| I-7 | — | $Cr_3C_2$ VC | 0.2 0.1 | 8.0 | $Cr_3C_2$ VC | 0.6 0.3 | 1.58 | 1.63 | 0.97 | 5.5 | 5.5 | 0.5 |
| I-8 | — | $Cr_3C_2$ VC | 0.2 0.1 | 8.0 | $Cr_3C_2$ VC | 0.6 0.3 | 1.58 | 1.63 | 0.97 | 5.5 | 5.5 | 0.5 |
| I-9 | — | $Cr_3C_2$ VC | 0.2 0.1 | 8.0 | $Cr_3C_2$ VC | 0.6 0.3 | 1.58 | 1.63 | 0.97 | 5.5 | 5.5 | 0.5 |
| I-10 | — | $Cr_3C_2$ VC | 0.2 0.1 | 8.0 | $Cr_3C_2$ VC | 0.6 0.3 | 1.58 | 1.63 | 0.97 | 5.5 | 5.5 | 0.5 |
| I-11 | — | $Cr_3C_2$ VC | 0.2 0.1 | 8.0 | $Cr_3C_2$ VC | 0.6 0.3 | 1.58 | 1.63 | 0.97 | 5.5 | 5.5 | 0.5 |
| I-12 | 5.0 | $Cr_3C_2$ VC | 0.4 0.3 | 5.0 | $Cr_3C_2$ VC | 0.4 0.3 | 1.58 | 1.63 | 0.97 | 5.5 | 5.5 | 0.5 |
| I-13 | 2.0 | $Cr_3C_2$ VC | 0.2 0.1 | 2.0 | $Cr_3C_2$ VC | 0.2 0.1 | 1.58 | 1.63 | 0.97 | 5.5 | 5.5 | 0.5 |
| I-14 | — | $Cr_3C_2$ VC | 0.2 0.1 | 8.0 | $Cr_3C_2$ VC | 0.6 0.3 | 1.58 | 1.63 | 0.97 | 5.5 | 5.5 | 0.5 |
| I-15 | 3.0 | $Cr_3C_2$ VC | 0.2 0.1 | 7.0 | $Cr_3C_2$ VC | 0.6 0.3 | 1.58 | 1.63 | 0.97 | 5.5 | 5.5 | 0.5 |
| I-16 | 3.0 | $Cr_3C_2$ VC | 0.2 0.1 | 7.0 | $Cr_3C_2$ VC | 0.6 0.3 | 1.58 | 1.63 | 0.97 | 5.5 | 5.5 | 0.5 |
| I-17 | — | $Cr_3C_2$ VC | 0.2 0.1 | 8.0 | $Cr_3C_2$ VC | 0.6 0.3 | 1.58 | 1.63 | 0.97 | 5.5 | 5.5 | 0.5 |
| I-18 | — | $Cr_3C_2$ VC | 0.2 0.1 | 8.0 | $Cr_3C_2$ VC | 0.6 0.3 | 1.58 | 1.63 | 0.97 | 5.5 | 5.5 | 0.5 |
| I-19 | — | $Cr_3C_2$ VC | 0.2 0.1 | 8.0 | $Cr_3C_2$ VC | 0.6 0.3 | 1.58 | 1.63 | 0.97 | 5.5 | 5.5 | 0.5 |

TABLE 2

| Sample No. | Firing conditions | | | | | Blank | | | | | | | |
|---|---|---|---|---|---|---|---|---|---|---|---|---|---|
| | Temperature rise rate (° C./min) | Reduced pressure (Pa) | Firing temperature (° C.) | HIP temperature (° C.) | Temperature difference (° C.) | Length (mm) | | | | | Diameter (mm) | | |
| | | | | | | L | $L_4$ | $L_1$ | $L_3$ | $L_2$ | $d_A$ | $d_B$ | $L/d_A$ |
| I-1 | 5.0 | 80 | 1380 | 1370 | 10 | 8.8 | 0.0 | 4.5 | 0.1 | 4.2 | 1.34 | 1.32 | 6.6 |
| I-2 | 4.5 | 100 | 1370 | 1360 | 10 | 8.8 | 0.0 | 2.4 | 0.1 | 6.3 | 1.33 | 1.31 | 6.6 |
| I-3 | 6.0 | 150 | 1390 | 1375 | 15 | 9.0 | 0.1 | 5.9 | 0.1 | 2.9 | 1.35 | 1.33 | 6.7 |
| I-4 | 5.0 | 80 | 1400 | 1390 | 10 | 8.7 | 0.0 | 4.4 | 0.1 | 4.2 | 2.03 | 1.92 | 4.3 |
| I-5 | 5.0 | 60 | 1380 | 1370 | 10 | 8.8 | 0.0 | 4.4 | 0.1 | 4.3 | 1.10 | 1.08 | 8.0 |
| I-6 | 4.0 | 100 | 1380 | 1370 | 10 | 8.8 | 0.0 | 4.5 | 0.1 | 4.2 | 1.33 | 1.25 | 6.6 |
| I-7 | 7.0 | 100 | 1380 | 1370 | 10 | 8.9 | 0.1 | 4.5 | 0.1 | 4.2 | 1.36 | 1.32 | 6.5 |
| I-8 | 5.0 | 50 | 1380 | 1370 | 10 | 8.8 | 0.0 | 4.5 | 0.1 | 4.2 | 1.33 | 1.25 | 6.6 |
| I-9 | 5.0 | 200 | 1380 | 1370 | 10 | 8.8 | 0.1 | 4.5 | 0.1 | 4.2 | 1.36 | 1.32 | 6.5 |
| I-10 | 5.0 | 100 | 1380 | 1375 | 5 | 8.8 | 0.0 | 4.5 | 0.1 | 4.2 | 1.33 | 1.25 | 6.6 |

TABLE 2-continued

| Sample No. | Firing conditions | | | | | Blank | | | | | | | | |
|---|---|---|---|---|---|---|---|---|---|---|---|---|---|---|
| | Temperature rise rate (° C./min) | Reduced pressure (Pa) | Firing temperature (° C.) | HIP temperature (° C.) | Temperature difference (° C.) | Length (mm) | | | | | Diameter (mm) | | | |
| | | | | | | L | $L_4$ | $L_1$ | $L_3$ | $L_2$ | $d_A$ | $d_B$ | $L/d_A$ | |
| I-11 | 5.0 | 100 | 1380 | 1360 | 20 | 8.8 | 0.0 | 4.5 | 0.1 | 4.2 | 1.36 | 1.32 | 6.5 | |
| I-12 | 5.0 | 100 | 1380 | 1370 | 10 | 8.9 | 0.0 | | 8.9 | | 1.33 | 1.33 | 6.7 | |
| I-13 | 5.0 | 100 | 1380 | 1370 | 10 | 9.8 | 0.0 | | 9.8 | | 1.46 | 1.42 | 6.7 | |
| I-14 | 3.0 | 100 | 1380 | 1370 | 10 | 8.8 | 0.0 | | 8.8 | | 1.33 | 1.25 | 6.6 | |
| I-15 | 8.0 | 100 | 1380 | 1370 | 10 | 9.1 | 0.2 | 4.4 | 0.1 | 4.4 | 1.36 | 1.32 | 6.7 | |
| I-16 | 7.0 | 30 | 1380 | 1370 | 10 | 8.7 | 0.0 | | 8.7 | | 1.33 | 1.25 | 6.5 | |
| I-17 | 7.0 | 300 | 1380 | 1370 | 10 | 9.1 | 0.2 | 4.4 | 0.1 | 4.4 | 1.36 | 1.32 | 6.7 | |
| I-18 | 10.0 | 100 | 1380 | 1376 | 4 | 8.7 | 0.0 | | 8.7 | | 1.33 | 1.25 | 6.5 | |
| I-19 | 10.0 | 100 | 1380 | 1355 | 25 | 9.0 | 0.1 | 4.4 | 0.1 | 4.4 | 1.36 | 1.32 | 6.6 | |

TABLE 3

| Sample No. | Blank | | | | | | | | Flank wear width (µm) | Number of processed pieces |
|---|---|---|---|---|---|---|---|---|---|---|
| | Co content (mass %) | | | $Co_{AC}/Co_{BC}$ | (mass %/mm) | | | | | |
| | $Co_{AO}$ | $Co_{AC}$ | $Co_{BC}$ | | $S_4$ | $S_1$ | $S_3$ | $S_2$ | | |
| I-1 | 1.5 | 1.8 | 5.0 | 0.36 | — | 0.42 | 12.0 | 0.024 | 120 | 5000 |
| I-2 | 1.8 | 2.0 | 6.3 | 0.32 | — | 0.96 | 14.0 | 0.095 | 130 | 4600 |
| I-3 | 0.0 | 0.0 | 4.0 | 0.00 | 0.00 | 0.47 | 6.0 | 0.207 | 180 | 4000 |
| I-4 | 2.3 | 3.4 | 4.8 | 0.71 | — | 0.14 | 7.0 | 0.024 | 180 | 3800 |
| I-5 | 2.4 | 3.5 | 4.7 | 0.74 | — | 0.11 | 6.0 | 0.023 | 200 | 3700 |
| I-6 | 1.7 | 2.5 | 4.2 | 0.60 | — | 0.22 | 6.0 | 0.024 | 190 | 4300 |
| I-7 | 0.0 | 0.0 | 7.0 | 0.00 | 0.00 | 1.00 | 22.0 | 0.071 | 160 | 4100 |
| I-8 | 1.8 | 2.6 | 4.2 | 0.62 | — | 0.20 | 6.0 | 0.024 | 190 | 4200 |
| I-9 | 0.0 | 1.4 | 7.0 | 0.20 | 0.00 | 0.69 | 22.0 | 0.071 | 170 | 4300 |
| I-10 | 2.1 | 2.6 | 4.0 | 0.65 | — | 0.20 | 4.0 | 0.024 | 170 | 4400 |
| I-11 | 0.0 | 1.5 | 7.0 | 0.21 | — | 0.73 | 22.0 | 0.071 | 160 | 4300 |
| I-12 | | 5.0 | | 1.00 | — | | — | | 350 | 2400 |
| I-13 | | 2.0 | | 1.00 | | | — | | — | Initial fracture |
| I-14 | 3.8 | 4.0 | 4.5 | 0.89 | — | | | | 280 | 2400 |
| I-15 | 1.2 | 1.5 | 6.8 | 0.22 | — | 0.52 | 7.0 | 0.523 | 250 | 2300 |
| I-16 | 3.8 | 4.0 | 4.5 | 0.89 | | | — | | 290 | 2100 |
| I-17 | 1.1 | 1.2 | 6.8 | 0.18 | — | 0.56 | 6.2 | 0.568 | 260 | 2500 |
| I-18 | 3.8 | 4.0 | 4.5 | 0.89 | | | — | | 320 | 2600 |
| I-19 | 1.2 | 1.4 | 6.6 | 0.21 | — | 0.41 | 15.0 | 0.432 | 260 | 2600 |

As shown in Tables 1 to 3, sample No. I-12 with $CO_{AC}$ equal to $Co_{BC}$ had a large flank wear width, and sample No. I-13 with $Co_{AC}$ equal to $Co_{BC}$ fractured at the first boring due to insufficient sintering. Sample Nos. I-14, I-16, and I-18 with no first and second portions had a large flank wear width. Sample Nos. I-15, I-17, and I-19 with the gradient $S_1$ equal to or smaller than the gradient $S_2$ had low fracture resistance, and successfully processed a small number of pieces.

In contrast, sample Nos. I-1 to I-11 with $Co_{AC}$ smaller than $Co_{BC}$ and with the gradient $S_1$ of the first portion larger than the gradient $S_2$ of the second portion had a small flank wear width, and successfully processed a large number of pieces.

In particular, sample Nos. I-1, I-2, I-6, and I-8 to I-11 with the ratio $Co_{AC}/Co_{BC}$ ranging from 0.2 to 0.7 successfully processed a large number of pieces. Sample Nos. I-1, I-2, and I-6 to I-11 with the gradient $S_1$ ranging from 0.2 to 1.0 percent by mass per millimeter and with the gradient $S_2$ ranging from 0 to 0.20 percent by mass per millimeter successfully processed a large number of pieces.

Example 2

The material powders used in Example 1 were also used to form compacts shown in Table 4. The compacts were fired under the conditions shown in Table 5. The blanks were used to form drills. The resultant drills were tested for drilling under the conditions described below. Tables 5 and 6 show the results.

Drilling Test Conditions
Workpiece material: FR4 material, one 24-layer stack, 3.2 mm thick
Drill shape: φ0.25 mm
Revolutions: 160 krpm
Feed speed: 3.2 m/min
Evaluation items: the number of successfully bored pieces and the flank wear width (µm) of the tested drill

TABLE 4

| Sample No. | First material powder Co added (mass %) | Additive | Added (mass %) | Second material powder Co added (mass %) | Additive | Added (mass %) | Compact size $D_A$ (mm) | $D_B$ (mm) | $D_A/D_B$ | $H_A$ (mm) | $H_B$ (mm) | $H_A/(H_A + H_B)$ |
|---|---|---|---|---|---|---|---|---|---|---|---|---|
| II-1 | — | $Cr_3C_2$ | 0.2 | 5.0 | $Cr_3C_2$ | 0.5 | 1.58 | 1.63 | 0.97 | 5.5 | 5.5 | 0.5 |
|  |  | VC | 0.1 |  | VC | 0.2 |  |  |  |  |  |  |
| II-2 | — | $Cr_3C_2$ | 0.2 | 5.0 | $Cr_3C_2$ | 0.5 | 1.58 | 1.63 | 0.97 | 2.5 | 8.5 | 0.2 |
|  |  | VC | 0.1 |  | VC | 0.3 |  |  |  |  |  |  |
| II-3 | — | $Cr_3C_2$ | 0.2 | 5.0 | $Cr_3C_2$ | 0.4 | 1.58 | 1.63 | 0.97 | 8.5 | 2.5 | 0.8 |
|  |  | VC | 0.1 |  | VC | 0.3 |  |  |  |  |  |  |
| II-4 | 2.0 | $Cr_3C_2$ | 0.2 | 5.0 | $Cr_3C_2$ | 0.4 | 1.58 | 1.63 | 0.97 | 5.5 | 5.5 | 0.5 |
|  |  | VC | 0.1 |  | VC | 0.3 |  |  |  |  |  |  |
| II-5 | 5.0 | $Cr_3C_2$ | 0.2 | 5.0 | $Cr_3C_2$ | 0.2 | 1.58 | 1.63 | 0.97 | 5.5 | 5.5 | 0.5 |
|  |  | VC | 0.4 |  | VC | 0.4 |  |  |  |  |  |  |

TABLE 5

| Sample No. | Firing conditions Temperature rise rate (° C./min) | Reduced pressure (Pa) | Firing temperature (° C.) | HIP temperature (° C.) | Temperature difference (° C.) | Blank Length (mm) L | $L_4$ | $L_1$ | $L_3$ | $L_2$ | Diameter (mm) $d_A$ | $d_B$ | $L/d_A$ |
|---|---|---|---|---|---|---|---|---|---|---|---|---|---|
| II-1 | 5.0 | 80 | 1380 | 1370 | 10 | 8.8 | 0.0 | 4.5 | 0.1 | 4.2 | 1.38 | 1.34 | 6.4 |
| II-2 | 4.5 | 100 | 1370 | 1360 | 10 | 8.9 | 0.0 | 2.4 | 0.2 | 6.3 | 1.37 | 1.33 | 6.5 |
| II-3 | 6.0 | 150 | 1390 | 1375 | 15 | 8.9 | 0.1 | 5.9 | — | 2.9 | 1.38 | 1.32 | 6.4 |
| II-4 | 5.0 | 80 | 1400 | 1390 | 10 | 8.6 | 0.0 | 4.4 | — | 4.2 | 1.42 | 1.92 | 6.1 |
| II-5 | 5.0 | 100 | 1380 | 1370 | 10 | 8.9 | 0.0 | 8.9 |  |  | 1.33 | 1.33 | 6.7 |

TABLE 6

| Sample No. | Blank Co content (mass %) $Co_{AO}$ | $Co_{AC}$ | $Co_{BC}$ | $Co_{AC}/Co_{BC}$ | (mass %/mm) $S_4$ | $S_1$ | $S_3$ | $S_2$ | Flank wear width (μm) | Number of processed pieces |
|---|---|---|---|---|---|---|---|---|---|---|
| II-1 | 1.5 | 1.8 | 5.0 | 0.36 | — | 0.6 | 6.0 | 0.02 | 120 | 1500 |
| II-2 | 1.8 | 2.0 | 6.3 | 0.32 | — | 1.0 | 1.5 | 0.25 | 150 | 1600 |
| II-3 | 0.0 | 0.0 | 4.0 | 0.00 | 0.1 | 0.5 | — | 0.28 | 180 | 1000 |
| II-4 | 2.3 | 2.6 | 4.8 | 0.54 | — | 0.5 | — | 0.02 | 160 | 1400 |
| II-5 |  | 5.0 |  | 1.00 |  | — |  |  | 300 | 600 |

As shown in Tables 4 to 6, sample Nos. II-1 to II-4 with $Co_{AC}$ smaller than $Co_{BC}$ and with the gradient $S_1$ of the first portion larger than the gradient $S_2$ of the second portion had a small flank wear width, and successfully processed a large number of pieces.

In particular, sample Nos. II-1 and II-2 with a third portion having a gradient $S_3$ larger than the gradient $S_1$ between the second portion and the first portion had a small flank wear width, and successfully processed a large number of pieces. More specifically, sample No. II-1 with the gradient $S_3$ being 2 to 50 percent by mass per millimeter had a small flank wear width, and successfully processed a particularly large number of pieces.

Example 3

The material powders used in Example 1 were also used to form compacts shown in Table 7. The compacts were fired under the conditions shown in Table 8. The blanks were used to form drills. The resultant drills were tested for drilling under the conditions described below. Tables 8 and 9 show the results.

Drilling Test Conditions
Workpiece material: FP4 material, 0.06 mm thick, ten-layer stack
Drill shape: φ0.105 mm
Revolutions: 300 krpm
Feeding speed: 1.8 m/min
Evaluation items: the number of successfully bored pieces and the flank wear width (μm) of the tested drill

TABLE 7

| | First material powder | | | Second material powder | | | Compact size | | | | | |
|---|---|---|---|---|---|---|---|---|---|---|---|---|
| Sample No. | Co added (mass %) | Additive | Added (mass %) | Co added (mass %) | Additive | Added (mass %) | $D_A$ (mm) | $D_B$ (mm) | $D_A/D_B$ | $H_A$ (mm) | $H_B$ (mm) | $H_A/(H_A + H_B)$ |
| III-1 | — | $Cr_3C_2$ VC | 0.4 0.1 | 10.0 | $Cr_3C_2$ VC | 1.0 0.4 | 2.35 | 2.40 | 0.98 | 5.5 | 5.5 | 0.5 |
| III-2 | — | $Cr_3C_2$ VC | 0.5 0.2 | 12.0 | $Cr_3C_2$ VC | 1.2 0.6 | 2.35 | 2.40 | 0.98 | 5.5 | 5.5 | 0.5 |
| III-3 | — | $Cr_3C_2$ VC | 0.4 0.1 | 20.0 | $Cr_3C_2$ VC | 2.1 0.8 | 2.35 | 2.40 | 0.98 | 5.5 | 5.5 | 0.5 |
| III-4 | 12.0 | $Cr_3C_2$ VC | 0.5 0.2 | 12.0 | $Cr_3C_2$ VC | 1.5 0.7 | 2.35 | 2.40 | 0.98 | 5.5 | 5.5 | 0.5 |

TABLE 8

| | Firing conditions | | | | | Blank | | | | | | | |
|---|---|---|---|---|---|---|---|---|---|---|---|---|---|
| Sample No. | Temperature rise rate (° C./min) | Reduced pressure (Pa) | Firing temperature (° C.) | HIP temperature (° C.) | Temperature difference (° C.) | Length (mm) | | | | | Diameter (mm) | | |
| | | | | | | L | $L_4$ | $L_1$ | $L_3$ | $L_2$ | $d_A$ | $d_B$ | $L/d_A$ |
| III-1 | 5.0 | 80 | 1380 | 1370 | 10 | 9.0 | 0.0 | 4.5 | 0.3 | 4.2 | 2.00 | 1.91 | 4.5 |
| III-2 | 5.0 | 80 | 1380 | 1370 | 10 | 9.0 | 0.0 | 4.5 | 0.3 | 4.2 | 1.98 | 1.90 | 4.5 |
| III-3 | 5.0 | 80 | 1380 | 1370 | 10 | 9.0 | 0.0 | 4.5 | 0.3 | 4.2 | 1.96 | 1.89 | 4.6 |
| III-4 | 5.0 | 80 | 1380 | 1370 | 10 | 9.0 | | 9.0 | | | 1.98 | 1.90 | 4.5 |

TABLE 9

| | Blank | | | | | | | | Flank wear width (μm) | Number of processed pieces |
|---|---|---|---|---|---|---|---|---|---|---|
| Sample No. | Co content (mass %) | | | $Co_{AC}/Co_{BC}$ | (mass %/mm) | | | | | |
| | $Co_{AO}$ | $Co_{AC}$ | $Co_{BC}$ | | $S_4$ | $S_1$ | $S_3$ | $S_2$ | | |
| III-1 | 3.1 | 3.6 | 7.0 | 0.51 | — | 0.5 | 2.3 | 0.10 | 200 | 2500 |
| III-2 | 3.9 | 4.2 | 9.0 | 0.47 | — | 0.5 | 8.3 | 0.05 | 150 | 3000 |
| III-3 | 7.6 | 8.0 | 15.0 | 0.53 | — | 0.7 | 12.0 | 0.10 | 300 | 2000 |
| III-4 | | 12.0 | | — | | — | | | 450 | 1000 |

As shown in Tables 7 to 9, sample Nos. III-1 to III-3 with $CO_{AC}$ smaller than $Co_{BC}$ and with the gradient $S_1$ of the first portion larger than the gradient $S_2$ of the second portion had a small flank wear width, and successfully processed a large number of pieces.

Example 4

As in Example 1, the first material powders and the second material powders shown in Table 10 were used for molding. For sample No. IV-5 with $d_C/d_A$ of the fired blank greater than 0.9, the lower punch was fractured after 100 compacts were formed.

The compacts were heated at temperature rise rates shown in Table 10, and fired for 30 minutes at the temperatures shown in Table 10 as in Example 1. Then, the compacts underwent sinter-HIP firing at the temperatures that are 30° C. lower than the temperatures in Table 10. The outer periphery of each resultant sintered body underwent centerless grinding to form a blank.

For the longitudinal direction of each resultant blank, the diameters $d_A$, $d_B$, $d_C$ of part A, part B, and the protrusion, and changes in the Co content across the section from part A to the protrusion were measured through the EPMA analysis to detect the second to fourth portions, the gradients, and the lengths as in Example 1. The Co content $CO_{AO}$ was also measured. Further, both ends of the blank were observed with a scanning electron microscope (SEM), and the mean particle diameter of the WC particles in part A and part B was calculated through a LUZEX analysis. Tables 11 and 12 show the results.

As in Example 1, the blanks were randomly placed into the joining machine. In the joining machine, the protrusion of each blank was detected, and the blanks were aligned to have their parts A and parts B of the bodies arranged in the same directions to form a drill through the same processes as in Example 1. The protrusion allows part A and part B to be easily distinguished. This allows easy formation of a drill with a small content of Co in its portion adjacent to the cutting edges. For sample Nos. IV-1 to IV-5, and IV-7 to IV-13 with round protrusions, collisions between blanks being placed into the joining machine did not damage the blanks.

The resultant drills were tested for drilling under the conditions described below. Table 12 shows the results.

Drilling Test Conditions
Workpiece material: BT material, one 10-layer stack, 2.5 mm thick
Drill shape: φ0.3 mm, undercutting
Revolutions: 100 krpm
Feeding speed: 1.5 m/min
Evaluation item: the number of successfully bored pieces

TABLE 10

| | First material powder | | | Second material powder | | | Compact shape | | | | | | Firing conditions | |
|---|---|---|---|---|---|---|---|---|---|---|---|---|---|---|
| Sample No. | Co added (mass %) | Additive | Added (mass %) | Co added (mass %) | Additive | Added (mass %) | $D_A$ (mm) | $D_B$ (mm) | $D_A/D_B$ | $H_A$ (mm) | $H_B$ (mm) | $H_A/(H_A + H_B)$ | Temperature rise rate (° C./min) | Firing temperature (° C.) |
| IV-1 | — | $Cr_3C_2$ VC | 0.4 0.1 | 8.0 | $Cr_3C_2$ VC | 0.6 0.3 | 1.58 | 1.63 | 0.97 | 5.5 | 5.5 | 0.5 | 10.0 | 1400 |
| IV-2 | — | $Cr_3C_2$ VC | 0.5 0.2 | 7.0 | $Cr_3C_2$ VC | 0.5 0.3 | 1.50 | 1.65 | 0.91 | 4.5 | 6.5 | 0.4 | 7.0 | 1400 |
| IV-3 | — | $Cr_3C_2$ VC | 0.4 0.2 | 5.0 | $Cr_3C_2$ VC | 0.4 0.3 | 1.28 | 1.35 | 0.95 | 4.0 | 7.0 | 0.4 | 12.0 | 1370 |
| IV-4 | 2.0 | VC | 0.5 | 10.0 | $Cr_3C_2$ VC | 0.2 0.4 | 2.35 | 2.35 | 1.00 | 2.0 | 9.0 | 0.2 | 10.0 | 1420 |
| IV-5 | 2.0 | VC | 0.5 | 10.0 | $Cr_3C_2$ VC | 0.2 0.4 | 2.35 | 2.35 | 1.00 | 2.0 | 9.0 | 0.2 | 10.0 | 1420 |
| IV-6 | — | $Cr_3C_2$ | 0.6 | 4.0 | $Cr_3C_2$ | 0.6 | 2.00 | 2.20 | 0.91 | 3.0 | 8.0 | 0.3 | 15.0 | 1390 |
| IV-7 | — | $Cr_3C_2$ VC | 0.4 0.1 | 8.0 | $Cr_3C_2$ VC | 0.6 0.3 | 1.58 | 1.63 | 0.97 | 5.5 | 5.5 | 0.5 | 7.0 | 1400 |
| IV-8 | — | — | | 13.0 | $Cr_3C_2$ VC | 0.6 0.3 | 1.58 | 1.63 | 0.97 | 6.5 | 4.5 | 0.6 | 15.0 | 1350 |
| IV-9 | — | $Cr_3C_2$ VC | 0.4 0.3 | 8.0 | $Cr_3C_2$ VC | 0.6 0.3 | 1.10 | 1.20 | 0.92 | 4.0 | 7.0 | 0.4 | 5.0 | 1380 |
| IV-10 | — | $Cr_3C_2$ VC | 0.4 0.2 | 8.0 | $Cr_3C_2$ VC | 0.6 0.3 | 1.03 | 1.06 | 0.97 | 0.5 | 6.0 | 0.5 | 35.0 | 1400 |
| IV-11 | 5.0 | $Cr_3C_2$ VC | 0.4 0.3 | 5.0 | $Cr_3C_2$ VC | 0.4 0.3 | 1.20 | 1.20 | 1.00 | 5.5 | 5.5 | 0.5 | 7.0 | 1420 |
| IV-12 | 10.0 | VC | 0.5 | 10.0 | $Cr_3C_2$ VC | 0.3 0.2 | 1.00 | 1.00 | 1.00 | 5.5 | 5.5 | 0.5 | 7.0 | 1550 |
| IV-13 | 3.0 | $Cr_3C_2$ VC | 0.4 0.2 | 7.0 | $Cr_3C_2$ VC | 0.6 0.3 | 1.03 | 1.06 | 0.97 | 7.0 | 4.0 | 0.6 | 10.0 | 1600 |

TABLE 11

| | Blank | | | | | | | | | | Protrusion | |
|---|---|---|---|---|---|---|---|---|---|---|---|---|
| Sample No. | $d_A$ (mm) | $d_B$ (mm) | $d_C$ (mm) | $d_C/d_A$ | L | $L_4$ | $L_1$ | $L_3$ | $L_2$ | $L_C$ | shape | $L/d_A$ |
| IV-1 | 1.10 | 1.05 | 0.75 | 0.68 | 10.6 | 0.0 | 7.0 | 0.1 | 3.5 | 0.20 | Round | 9.6 |
| IV-2 | 1.18 | 1.12 | 1.06 | 0.90 | 10.4 | 0.0 | 5.7 | 0.1 | 4.6 | 0.25 | Round | 8.8 |
| IV-3 | 1.33 | 1.25 | 0.68 | 0.51 | 10.2 | 0.0 | 5.2 | 0.1 | 4.9 | 0.27 | Round | 7.7 |
| IV-4 | 2.00 | 1.72 | 1.09 | 0.55 | 10.3 | 0.0 | 3.4 | 0.1 | 6.8 | 0.35 | Round | 5.2 |
| IV-5 | 2.00 | 1.72 | 0.90 | 0.45 | 10.3 | 0.0 | 3.4 | 0.1 | 6.8 | 0.35 | Round | 5.2 |
| IV-6 | 1.58 | 1.58 | 1.53 | 0.97 | 10.8 | 0.0 | 5.1 | 0.1 | 5.6 | 0.30 | Round | 6.8 |
| IV-7 | 1.10 | 1.05 | 0.75 | 0.68 | 10.6 | 0.0 | 7.0 | 0.1 | 3.5 | 0.20 | Sharp | 9.6 |
| IV-8 | 1.10 | 1.05 | 0.95 | 0.86 | 9.6 | 0.0 | 7.0 | 0.1 | 2.5 | 0.10 | Round | 8.7 |
| IV-9 | 0.94 | 0.94 | 0.67 | 0.71 | 10.7 | 0.0 | 5.6 | 0.1 | 5.0 | 0.30 | Round | 11.4 |
| IV-10 | 0.85 | 0.85 | 0.64 | 0.75 | 10.5 | 0.0 | 6.9 | 0.1 | 3.5 | 0.15 | Round | 12.4 |
| IV-11 | 1.02 | 1.02 | 0.58 | 0.57 | 10.4 | | | | | 0.20 | Round | 10.2 |
| IV-12 | 0.86 | 0.86 | 0.58 | 0.67 | 9.8 | | | | | 0.20 | Round | 11.4 |
| IV-13 | 0.81 | 0.81 | 0.56 | 0.69 | 10.4 | | | | | 0.20 | Round | 12.8 |

TABLE 12

| | Blank | | | | | | | | | | | WC mean particle diameter | | Number of |
|---|---|---|---|---|---|---|---|---|---|---|---|---|---|---|
| | Co content (mass %) | | | | $Co_{AC}/Co_{BC}$ | $Co_{AO}/Co_{AC}$ | $Co_{CC}/Co_{AC}$ | (mass %/mm) | | | | Part A | Part B | processed |
| Sample No. | $Co_{AO}$ | $Co_{AC}$ | $Co_{BC}$ | $Co_{CC}$ | | | | $S_4$ | $S_1$ | $S_3$ | $S_2$ | (μm) | (μm) | pieces |
| IV-1 | 1.3 | 1.5 | 6.5 | 0.5 | 0.19 | 0.83 | 0.33 | — | 0.53 | 10.0 | 0.086 | 0.35 | 0.33 | 5000 |
| IV-2 | 1.8 | 2.0 | 5.0 | 1.0 | 0.36 | 0.90 | 0.50 | — | 0.39 | 5.0 | 0.065 | 0.37 | 0.35 | 4600 |
| IV-3 | 0.0 | 0.5 | 3.5 | 0.2 | 0.00 | 0.00 | 0.40 | 0.0 | 0.46 | 5.0 | 0.020 | 0.34 | 0.31 | 4800 |
| IV-4 | 3.8 | 5.6 | 7.0 | 4.9 | 0.54 | 0.68 | 0.88 | — | 0.21 | 6.0 | 0.015 | 0.32 | 0.32 | 4000 |
| IV-5 | 3.8 | 5.6 | 7.0 | 4.8 | 0.54 | 0.68 | 0.86 | — | 0.21 | 6.0 | 0.015 | 0.32 | 0.32 | 3900 |
| IV-6 | 0.1 | 0.16 | 1.8 | 0.11 | 0.06 | 0.69 | 0.69 | — | 0.16 | 4.0 | 0.071 | 0.31 | 0.31 | 4100 |
| IV-7 | 1.4 | 2.0 | 6.5 | 0.1 | 0.21 | 0.68 | 0.05 | — | 0.53 | 6.0 | 0.057 | 0.35 | 0.33 | 4300 |

TABLE 12-continued

| | Blank | | | | | | | | | | | | |
|---|---|---|---|---|---|---|---|---|---|---|---|---|---|
| Sample | Co content (mass %) | | | | $Co_{AC}/$ $Co_{BC}$ | $Co_{AO}/$ $Co_{AC}$ | $Co_{CC}/$ $Co_{AC}$ | (mass %/mm) | | | | WC mean particle diameter | | Number of processed pieces |
| No. | $Co_{AO}$ | $Co_{AC}$ | $Co_{BC}$ | $Co_{CC}$ | | | | $S_4$ | $S_1$ | $S_3$ | $S_2$ | Part A (μm) | Part B (μm) | |
| IV-8 | 3.0 | 7.5 | 12.5 | 6.5 | 0.24 | 0.40 | 0.87 | 0.0 | 0.26 | 31.0 | 0.040 | 0.29 | 0.29 | 3200 |
| IV-9 | 6.7 | 6.8 | 7.2 | 6.8 | 0.93 | 0.99 | 1.00 | — | 0.04 | 0.0 | 0.040 | 0.29 | 0.29 | 2400 |
| IV-10 | 3.5 | 5.0 | 5.0 | 4.0 | 0.70 | 0.70 | 0.80 | 0.0 | 0.00 | 0.0 | 0.000 | 0.23 | 0.23 | 2300 |
| IV-11 | | | 5.0 | | | | | | — | | | 0.32 | 0.29 | 2100 |
| IV-12 | | | 10.0 | | | | | | — | | | 0.32 | 0.28 | 2500 |
| IV-13 | | | 5.5 | | | | | | — | | | 0.33 | 0.27 | 2600 |

As shown in Tables 10 to 12, sample Nos. IV-1 to IV-8 with $Co_{AC}$ smaller than $Co_{BC}$ and with the gradient $S_1$ of the first portion larger than the gradient $S_2$ of the second portion had a small flank wear width, and successfully processed a large number of pieces. The drills of sample Nos. IV-10 to IV-13 with $Co_{AC}$ equal to $Co_{BC}$ and sample No. IV-9 with $S_1$ equal to $S_2$ successfully processed a small number of pieces.

The drills of sample Nos. IV-1 to IV-8 also with $Co_{CC}$ smaller than $Co_{AC}$ successfully processed a large number of pieces. Among sample Nos. IV-1 to IV-8, the drills of sample Nos. IV-1 to IV-3 successfully processed a large number of pieces. Sample Nos. IV-1 to IV-3 had $Co_{AC}$ ranging from 0.2 to 7 percent by mass, $Co_{BC}$ ranging from 2 to 12 percent by mass, the ratio $Co_{AC}/Co_{BC}$ ranging from 0.1 to 0.6, and $Co_{CC}$ ranging from 0.1 to 6 percent by mass, and the ratio $Co_{CC}/Co_{AC}$ ranging from 0.1 to 0.8.

Unlike sample No. 5, for sample No. IV-5 with $d_C/d_A$ of the fired blank smaller than 0.5, the entire protrusion was ground away when cutting edges are formed in the drill. The drill, which reduced the wear resistance of the cutting edges, processed a small number of pieces.

Example 5

In contrast to the first material powder and the second material powder used for sample No. IV-1 in Example 4, the material powders with the same characteristics as sample No. 1 in Example 1 were used, except that the WC powder had a mean particle diameter of 0.8 μm. In the same manner as for sample No. 1, elongated and cylindrical compacts were formed by cold isostatic pressing. In the compacts, $D_A$32 $D_B$=6 mm, L=30 mm, $D_C$=3 mm, and $L_C$=3 mm. Also, $H_A$=10 mm, and $H_B$=20 mm. The compacts were fired at the same temperature rise rate and the same firing temperature as for sample No. IV-1 to obtain sintered bodies, in which $d_A$=5.1 mm, $d_B$=4.8 mm, $L_A$=15 mm, $L_B$=9.3 mm, $(L_A+L_B)/d_A$=4.8, $CO_{AC}$=2.7% by mass, $Co_{BC}$=7.1% by mass, $Co_{CC}$=2.5% by mass, the mean particle diameter of the WC particles in part A was 0.85 μm, and the mean particle diameter of the WC particles in part B was 0.80 μm. Cutting edges for a drill were successfully formed in the resultant sintered bodies.

Example 6

As in Example 4, the first material powders, the second material powders, and the third material powders shown in Table 13 were used to form blanks. For sample No. 5 with $d_C/d_A$ of the fired blank greater than 0.9, the lower punch was fractured after 100 compacts were formed. For sample No. 6 with $d_C/d_A$ smaller than 0.5, some compacts had a portion near the protrusion of a compact damaged in the molding process, and the molding yields were low.

The compacts were heated at temperature rise rates shown in Table 14, and fired for 30 minutes at the temperatures shown in Table 14 as in Example 4. The compacts then underwent sinter-HIP firing at the temperatures 30° C. lower than the temperatures in Table 14. The outer periphery of each resultant sintered body underwent centerless grinding to form a blank.

To measure the length of each resultant blank, changes in the Co content across the section from part A to the protrusion were measured through the EPMA analysis to detect the second to fourth portions, the gradients, and the lengths as in Example 4. The Co content $Co_{AO}$ was also measured. Further, both ends of the blank were observed with the SEM, and the mean particle diameter of the WC particles in part A and part B was calculated through a LUZEX analysis. Tables 14 and 15 show the results.

As in Example 4, the blanks were randomly placed into the joining machine. In the joining machine, the protrusion of each blank was detected, and the blanks were aligned to have their parts A and parts B of the bodies arranged in the same directions to form an end mill through the same processes as in Example 4. The protrusion allows part A and part B to be easily distinguished. This allows easy formation of an end mill with a small content of Co in its portion adjacent to the cutting edges. Tables 14 and 15 show the results.

For sample Nos. VI-1 to VI-3, and VI-5 to VI-12 with round protrusions, the blanks were not damaged when colliding one another in the process of being placed into the joining machine.

The resultant end mills were tested for machining under the conditions described below. Table 15 shows the results.

End Mill Machining Test Conditions

Workpiece material: S45C block material

End mill shape: φ1 mm, two-flute

Revolutions: 25 krpm

Feeding speed: 220 mm/min

Cut (depth ap): 1.5 mm

Cut (width ae): 0.05 mm

Evaluation item: the distance machined by side cutting

TABLE 13

| Sample No. | First material powder Co added (mass %) | Additive | Added (mass %) | Second material powder Co added (mass %) | Additive | Added (mass %) | Third material powder Co added (mass %) | Additive | Added (mass %) | Compact size $D_A$ (mm) | $D_B$ (mm) | $D_A/D_B$ | $H_A$ (mm) | $H_B$ (mm) | $H_A/(H_A+H_B)$ |
|---|---|---|---|---|---|---|---|---|---|---|---|---|---|---|---|
| VI-1 | 10.0 | $Cr_3C_2$ VC | 0.6 0.3 | — | $Cr_3C_2$ VC | 0.4 0.1 | 8.0 | $Cr_3C_2$ VC | 0.6 0.3 | 1.58 | 1.63 | 0.97 | 5.5 | 5.5 | 0.5 |
| VI-2 | 8.0 | $Cr_3C_2$ VC | 0.4 0.3 | — | $Cr_3C_2$ VC | 0.4 0.2 | 5.0 | $Cr_3C_2$ VC | 0.4 0.3 | 1.28 | 1.35 | 0.95 | 4.0 | 7.0 | 0.4 |
| VI-3 | 7.0 | $Cr_3C_2$ VC | 0.5 0.3 | — | $Cr_3C_2$ VC | 0.5 0.2 | 7.0 | $Cr_3C_2$ VC | 0.5 0.3 | 1.50 | 1.65 | 0.91 | 4.5 | 6.5 | 0.4 |
| VI-4 | 15.0 | $Cr_3C_2$ VC | 0.6 0.3 | — | $Cr_3C_2$ VC | 0.4 0.1 | 15.0 | $Cr_3C_2$ VC | 0.6 0.3 | 1.58 | 1.63 | 0.97 | 5.5 | 5.5 | 0.5 |
| VI-5 | 5.0 | $Cr_3C_2$ VC | 0.6 0.3 | — | $Cr_3C_2$ VC | 0.6 — | 4.0 | $Cr_3C_2$ VC | 0.6 0.3 | 2.00 | 2.20 | 0.91 | 3.0 | 8.0 | 0.3 |
| VI-6 | 6.0 | $Cr_3C_2$ VC | 0.2 0.4 | 2.0 | VC | 0.5 | 10.0 | $Cr_3C_2$ VC | 0.2 0.4 | 2.35 | 2.35 | 1.00 | 2.0 | 9.0 | 0.2 |
| VI-7 | 18.0 | $Cr_3C_2$ VC | 0.6 0.3 | — | — | — | 13.0 | $Cr_3C_2$ VC | 0.6 0.3 | 1.58 | 1.63 | 0.97 | 6.5 | 4.5 | 0.6 |
| VI-8 | 8.0 | $Cr_3C_2$ VC | 0.6 0.3 | — | $Cr_3C_2$ VC | 0.4 0.3 | 8.0 | $Cr_3C_2$ VC | 0.6 0.3 | 1.10 | 1.20 | 0.92 | 4.0 | 7.0 | 0.4 |
| VI-9 | 2.0 | $Cr_3C_2$ VC | 0.6 0.3 | 2.0 | $Cr_3C_2$ VC | 0.4 0.2 | 8.0 | $Cr_3C_2$ VC | 0.6 0.3 | 1.03 | 1.06 | 0.97 | 5.0 | 6.0 | 0.5 |
| VI-10 | 5.0 | $Cr_3C_2$ VC | 0.6 0.3 | 5.0 | $Cr_3C_2$ VC | 0.4 0.3 | 5.0 | $Cr_3C_2$ VC | 0.4 0.3 | 1.20 | 1.20 | 1.00 | 5.5 | 5.5 | 0.5 |
| VI-11 | — | $Cr_3C_2$ VC | 0.6 0.3 | 10.0 | VC | 0.5 | 10.0 | $Cr_3C_2$ VC | 0.3 0.2 | 1.00 | 1.00 | 1.00 | 5.5 | 5.5 | 0.5 |
| VI-12 | — | $Cr_3C_2$ VC | 0.6 0.3 | 3.0 | $Cr_3C_2$ VC | 0.4 0.2 | 7.0 | $Cr_3C_2$ VC | 0.6 0.3 | 1.03 | 1.06 | 0.97 | 7.0 | 4.0 | 0.6 |

TABLE 14

| Sample No. | Firing conditions Temperature rise rate (° C./min) | Firing temperature (° C.) | Blank $d_A$ (mm) | $d_B$ (mm) | $d_C$ (mm) | $d_C/d_A$ | Protrusion shape | Length (mm) L | $L_4$ | $L_1$ | $L_3$ | $L_2$ | $L_C$ | $L/d_A$ |
|---|---|---|---|---|---|---|---|---|---|---|---|---|---|---|
| VI-1 | 10.0 | 1400 | 1.10 | 1.05 | 0.75 | 0.68 | Round | 10.6 | 0.0 | 7.0 | 0.1 | 3.5 | 0.20 | 9.6 |
| VI-2 | 12.0 | 1370 | 1.33 | 1.25 | 0.68 | 0.51 | Round | 10.2 | 0.0 | 5.2 | 0.1 | 4.9 | 0.27 | 7.7 |
| VI-3 | 7.0 | 1400 | 1.18 | 1.12 | 1.06 | 0.90 | Round | 10.4 | 0.0 | 5.7 | 0.1 | 4.6 | 0.25 | 8.8 |
| VI-4 | 7.0 | 1370 | 1.10 | 1.04 | 0.75 | 0.68 | Sharp | 10.6 | 0.0 | 7.0 | 0.1 | 3.5 | 0.20 | 9.6 |
| VI-5 | 15.0 | 1390 | 1.58 | 1.58 | 1.53 | 0.97 | Round | 10.8 | 0.0 | 5.1 | 0.1 | 5.6 | 0.30 | 6.8 |
| VI-6 | 10.0 | 1420 | 2.00 | 1.72 | 0.90 | 0.45 | Round | 10.3 | 0.0 | 3.4 | 0.1 | 6.8 | 0.35 | 5.2 |
| VI-7 | 15.0 | 1350 | 1.10 | 1.05 | 0.95 | 0.86 | Round | 9.6 | 0.0 | 7.0 | 0.1 | 2.5 | 0.10 | 8.7 |
| VI-8 | 5.0 | 1380 | 0.94 | 0.94 | 0.67 | 0.71 | Round | 10.7 | 0.0 | 5.6 | 0.1 | 5.0 | 0.30 | 11.4 |
| VI-9 | 35.0 | 1400 | 0.85 | 0.85 | 0.64 | 0.75 | Round | 10.5 | 0.0 | 6.9 | 0.1 | 3.5 | 0.15 | 12.4 |
| VI-10 | 7.0 | 1420 | 1.02 | 1.02 | 0.58 | 0.57 | Round | 10.4 | | | | | 0.20 | 10.2 |
| VI-11 | 7.0 | 1550 | 0.86 | 0.86 | 0.58 | 0.67 | Round | 9.8 | | | | | 0.20 | 11.4 |
| VI-12 | 10.0 | 1600 | 0.81 | 0.81 | 0.56 | 0.69 | Round | 10.4 | | | | | 0.20 | 12.8 |

TABLE 15

| Sample No. | Blank Co content (mass %) $Co_{AO}$ | $Co_{AC}$ | $Co_{BC}$ | $Co_{CC}$ | $Co_{AC}/Co_{BC}$ | $Co_{CC}/Co_{AC}$ | $Co_{AO}/Co_{AC}$ | (mass %/mm) $S_4$ | $S_1$ | $S_3$ | $S_2$ | WC mean particle diameter Part A (μm) | Part B (μm) | Machining distance (m) |
|---|---|---|---|---|---|---|---|---|---|---|---|---|---|---|
| VI-1 | 1.5 | 2.6 | 5.0 | 0.6 | 0.52 | 2.54 | 0.58 | — | 0.27 | 4.0 | 0.029 | 0.35 | 0.33 | 50 |
| VI-2 | 0.5 | 2.1 | 3.5 | 5.5 | 0.60 | 2.62 | 0.24 | — | 0.19 | 3.0 | 0.020 | 0.34 | 0.31 | 49 |
| VI-3 | 2.5 | 3.0 | 5.0 | 3.6 | 0.60 | 1.20 | 0.83 | 0.0 | 0.21 | 7.0 | 0.022 | 0.37 | 0.35 | 47 |
| VI-4 | 6.3 | 7.0 | 12.0 | 13.9 | 0.58 | 1.99 | 0.90 | — | 0.49 | 13.0 | 0.086 | 0.35 | 0.33 | 44 |
| VI-5 | 0.05 | 0.1 | 3.1 | 0.7 | 0.03 | 7.00 | 0.50 | — | 0.49 | 2.0 | 0.054 | 0.31 | 0.31 | 42 |
| VI-6 | 5.1 | 5.4 | 7.0 | 5.8 | 0.77 | 1.07 | 0.94 | — | 0.38 | 2.0 | 0.015 | 0.32 | 0.32 | 40 |
| VI-7 | 7.5 | 8.6 | 12.2 | 14.1 | 0.70 | 1.64 | 0.87 | 0.0 | 0.23 | 17.0 | 0.120 | 0.29 | 0.29 | 33 |

TABLE 15-continued

| Sample No. | Co content (mass %) | | | | $Co_{AC}/Co_{BC}$ | $Co_{CC}/Co_{AC}$ | $Co_{AO}/Co_{AC}$ | (mass %/mm) | | | | WC mean particle diameter | | Machining distance (m) |
|---|---|---|---|---|---|---|---|---|---|---|---|---|---|---|
| | $Co_{AO}$ | $Co_{AC}$ | $Co_{BC}$ | $Co_{CC}$ | | | | $S_4$ | $S_1$ | $S_3$ | $S_2$ | Part A (μm) | Part B (μm) | |
| VI-8 | | 6.8 | | | | — | | — | 0.00 | 0.0 | 0.000 | 0.29 | 0.29 | 23 |
| VI-9 | 3.3 | 3.3 | 6.2 | 3.3 | 0.53 | 0.88 | 1.00 | 0.0 | 0.30 | 6.0 | 0.057 | 0.23 | 0.23 | 22 |
| VI-10 | | 5.0 | | | 1.00 | 1.00 | 1.00 | | — | | | 0.32 | 0.29 | 21 |
| VI-11 | 9.6 | 10.0 | 9.5 | | 0.96 | 0.99 | 1.04 | | — | | | 0.32 | 0.28 | 24 |
| VI-12 | 5.5 | 5.5 | 5.4 | | 1.00 | 9.98 | 1.00 | | — | | | 0.33 | 0.27 | 25 |

As shown in Tables 13 to 15, sample Nos. VI-1 to VI-7 with $Co_{AC}$ smaller than $Co_{BC}$ and with the gradient $S_1$ of the first portion larger than the gradient $S_2$ of the second portion had a small flank wear width and an elongated machining distance. For sample No. VI-12 with $Co_{AC}$ equal to $Co_{BC}$, sample No. VI-9 with $Co_{CC}$ equal to $Co_{AC}$, sample No. VI-11 with $Co_{CC}$ smaller than $Co_{AC}$, and sample Nos. VI-8 and VI-10 with $Co_{AC}$ equal to $Co_{BC}$ and $Co_{CC}$ equal to $Co_{AC}$, the end mills achieved short machining distances. In contrast, for sample Nos. VI-1 to VI-7 with $Co_{AC}$ smaller than $Co_{BC}$ and with $Co_{CC}$ larger than $Co_{AC}$, the end mills achieved long machining distances.

Among sample Nos. VI-1 to VI-7, for sample Nos. VI-1 to VI-4 with $Co_{AC}$ ranging from 0.2 to 7 percent by mass, $Co_{BC}$ from 3 to 12 percent by mass, the ratio $Co_{AC}/Co_{BC}$ ranging from 0.1 to 0.6, $Co_{CC}$ ranging from 3 to 14 percent by mass, and the ratio $Co_{CC}/Co_{AC}$ ranging from 1.2 to 3, the drills achieved long machining distances.

In sample Nos. VI-1 to VI-4, the Co content in a central area of the first end face was higher than the Co content in the outer periphery of the first end face. The Co content $CO_{AO}$ was 0.1 to 6.5 percent by mass, and the ratio $Co_{AO}/Co_{AC}$ was 0.1 to 0.9.

Example 7

In contrast to the first material powders, the second material powders, and the third material powders used for sample Nos. VI-6 and VI-10 in Example 6, material powders with the same formulated composition as sample Nos. VI-6 and VI-10 in Example 1 were used, except that the WC powder had a mean particle diameter of 0.8 μm. In the same manner as for sample Nos. VI-6 and VI-10, elongated and cylindrical compacts were formed by cold isostatic pressing. In the compacts, $D_A=D_B=6$ mm, L=30 mm, $D_C=3$ mm, and $L_C=3$ mm. Also, $H_A=10$ mm, and $H_B=20$ mm. The compacts were fired at the same temperature rise rate and the same firing temperature as for sample No. VI-1 to obtain the sintered bodies of sample Nos. VII-13 and VII-14.

For sample No. VII-13, $d_A$=5.1 mm, $d_B$=4.8 mm, $L_A$=15 mm, $L_B$=9.3 mm, $(L_A+L_B)/d_A$=4.8, $CO_{AC}$=5.6% by mass, $Co_{AO}$=5.0% by mass, $Co_{BC}$=7.2% by mass, $Co_{CC}$=6.2% by mass, the WC particles in part A had a mean particle diameter of 0.85 μm, and the WC particles in part B had a mean particle diameter of 0.80 μm.

For sample No. VII-14, $d_A$=5.0 mm, $d_B$=5.0 mm, L=25.0 mm, $CO_{AC}=CO_{AO}=CO_{BC}=Co_{CC}$=5.0% by mass, the WC particles in part A had a mean particle diameter of 0.80 μm, and the WC particles in part B had a mean particle diameter of 0.80 μm.

Cutting edges were formed in the resultant sintered bodies to form 4MFK end mills (KYOCERA Corporation). The resultant end mills had two shapes having different cutting edge lengths. The end mills were used for cutting under the conditions: workpiece material: SUS304, processing diameter: φ8 mm, cutting type: shouldering, processing speed: 85 m/min, revolutions: 3300 rpm, feed: 0.035 mm/flute, depth of cut: 5 mm, width of cut: 3 mm, and wet cutting. Sample No. VII-13 had a length of cut of 40 m, and the cutting edges of the end mills had normal wear. In contrast, sample No. VII-14 had a length of cut of 24 m, and fractures were observed near the end mill rotation axis.

REFERENCE SIGNS LIST 1 drill (cutting tool)
2 blank (cutting tool blank)
part A first end
part B second end
3 shank
5 cutting edge
6 flute
7 neck
8 body
11 first portion
12 second portion
13 third portion
14 fourth portion
15 protrusion
$d_A$ first end diameter
$d_B$ second end diameter
$d_C$ diameter at contact with first end A of protrusion
$D_A$ diameter of portion adjacent to lower punch
$D_B$ diameter of portion adjacent to upper punch
$D_C$ diameter at contact between raw protrusion of compact and lower part of compact

What is claimed is:
1. A rod, comprising:
 a cemented carbide member containing tungsten carbide (WC) and cobalt (Co), the cemented carbide member having an elongated shape, and the cemented carbide member comprising:
  a first end portion in a longitudinal direction, the first end portion having a Co content $Co_{AC}$;
  a second end portion in the longitudinal direction, the second end portion having a Co content $Co_{BC}$, the Co content $Co_{AC}$ being smaller than the Co content $Co_{BC}$;
  a first portion on a side of the first end portion, the first portion having a gradient $S_1$ representing a longitudinal change in a Co content per millimeter; and a second portion on a side of the second end portion, the second portion having a gradient $S_2$ representing a longitudinal change in a Co content per millimeter, the gradient $S_1$ being greater than the gradient $S_2$.

2. The rod according to claim 1, wherein the Co content $Co_{AC}$ is 0.2 to 7 percent by mass, and the Co content $Co_{BC}$ is 2 to 12 percent by mass.

3. The rod according to claim 1, wherein a ratio $Co_{AC}/Co_{BC}$ of the Co content $Co_{AC}$ to the Co content $Co_{BC}$ is 0.2 to 0.7.

4. The rod according to claim 1, wherein the first end portion comprises a central area and an outer periphery in a direction perpendicular to the longitudinal direction, and the central area has a Co content higher than a Co content in the outer periphery.

5. The rod according to claim 4, wherein when the outer periphery has a Co content $CO_{AO}$ of 0.1 to 6.5 percent by mass, a ratio $Co_{AO}/Co_{AC}$ of the Co content $CO_{AO}$ to the Co content $Co_{AC}$ is 0.1 to 0.9.

6. The rod according to claim 1, wherein the gradient $S_1$ is 0.2 to 1.0 percent by mass per millimeter, and the gradient $S_2$ is 0 to 0.2 percent by mass per millimeter.

7. The rod according to claim 1, wherein the cemented carbide member further comprises a third portion disposed between the first portion and the second portion, the third portion having a gradient $S_3$, the gradient $S_3$ being larger than the gradient $S_1$ of the first portion.

8. The rod according to claim 7, wherein the gradient $S_3$ is 2 to 50 percent by mass per millimeter.

9. The rod according to claim 1, wherein the first portion has a longitudinal length $L_1$, the second portion has a longitudinal length $L_2$, and a ratio $L_1/L_2$ is 0.2 to 2.

10. The rod according to claim 1, wherein a diameter $d_A$ of the first end portion is 2 millimeters (mm) or less, a diameter $d_B$ of the second end portion is 2 mm or less, and a ratio $L/d_A$ of a longitudinal length $L$ of the cemented carbide member to the diameter $d_A$ is 3 or more.

11. The rod according to claim 10, wherein a ratio $d_A/d_B$ of the diameter $d_A$ to the diameter $d_B$ is 1.02 to 1.20.

12. The rod according to claim 1, further comprising: a protrusion located on a first end face of the first end portion.

13. The rod according to claim 12, wherein the protrusion has a Co content smaller than the Co content $Co_{AC}$ in the first end portion.

14. The rod according to claim 13, wherein a Co content $Co_{CC}$ in a tip of the protrusion is 0.1 to 6 percent by mass, and a ratio $Co_{CC}/Co_{AC}$ of the Co content $Co_{CC}$ to a Co content $Co_{AC}$ in a central area of the first end portion in a direction perpendicular to the longitudinal direction is 0.1 to 0.8.

15. The rod according to claim 13, wherein the Co content in the protrusion is higher than the Co content $Co_{AC}$ in the first end portion.

16. The rod according to claim 15, wherein a Co content $Co_{CC}$ in a tip of the protrusion is 3 to 14 percent by mass, and a ratio $Co_{CC}/Co_{AC}$ of the Co content $Co_{CC}$ to the Co content $Co_{AC}$ in a central area of the first end portion in a direction perpendicular to the longitudinal direction is 1.2 to 3.

17. The rod according to claim 12, wherein the first end portion has a diameter $d_A$, the protrusion has a diameter $d_C$ at a position of contact with the first end portion, and a ratio $d_C/d_A$ of the diameter $d_C$ to the diameter $d_A$ is 0.5 to 0.9.

18. A cutting tool, comprising:
a cemented carbide member containing tungsten carbide (WC) and cobalt (Co), the cemented carbide member having an elongated shape, and the cemented carbide member comprising:
  a first end portion in a longitudinal direction, the first end portion having a Co content $Co_{AC}$;
  a second end portion in the longitudinal direction, the second end portion having a Co content $Co_{BC}$, the Co content $Co_{AC}$ being smaller than the Co content $CO_{BC}$;
  cutting edges at least on a side of the first end portion;
  a shank portion on a side of the second end portion;
  a first portion on a side of the first end portion, the first portion having a gradient $S_1$ representing a longitudinal change in a Co content per millimeter; and
  a second portion on a side of the second end portion, the second portion having a gradient $S_2$ representing a longitudinal change in a Co content per millimeter, the gradient $S_1$ being greater than the gradient $S_2$.

19. A method for manufacturing a cutting tool, the method comprising:
placing the rod according to claim 1 randomly into a joining machine;
distinguishing the first end portion of the rod from the second end portion in the joining machine and arranging the rod in a predetermined direction;
placing the second end portion of the rod in contact with a shank and joining the second end portion to the shank; and
forming cutting edges in a portion of the rod including the first end portion.

20. A method for manufacturing a cutting tool, the method comprising:
placing the rod according to claim 14 randomly into a joining machine;
arranging the rod in a predetermined direction in the joining machine based on whether the protrusion is detected or the protrusion is not detected;
joining the second end portion of the rod to a shank; and
forming cutting edges in a portion of the rod including the first end portion.

* * * * *